US008089596B2

(12) United States Patent
Koma et al.

(10) Patent No.: US 8,089,596 B2
(45) Date of Patent: Jan. 3, 2012

(54) TRANSFLECTIVE LIQUID CRYSTAL DISPLAY DEVICE AND COLOR LIQUID CRYSTAL DISPLAY DEVICE

(75) Inventors: Norio Koma, Gifu (JP); Kazuhiro Inoue, Mizuho (JP); Kazuyuki Maeda, Aichi (JP); Masaaki Aota, Ogaki (JP); Masayuki Kametani, Tottori (JP)

(73) Assignee: Sanyo Electric Co., Ltd. (JP)

(*) Notice: Subject to any disclaimer, the term of this patent is extended or adjusted under 35 U.S.C. 154(b) by 0 days.

(21) Appl. No.: 12/964,855

(22) Filed: Dec. 10, 2010

(65) Prior Publication Data

US 2011/0090442 A1 Apr. 21, 2011

Related U.S. Application Data

(63) Continuation of application No. 12/491,744, filed on Jun. 25, 2009, now Pat. No. 7,876,407, which is a continuation of application No. 11/132,767, filed on May 19, 2005, now Pat. No. 7,573,551.

(30) Foreign Application Priority Data

May 21, 2004 (JP) ................................ 2004-152609
Jul. 22, 2004 (JP) ................................ 2004-214628
Jul. 22, 2004 (JP) ................................ 2004-214629
Nov. 30, 2004 (JP) ................................ 2004-347905

(51) Int. Cl.
*G02F 1/1337* (2006.01)

(52) U.S. Cl. ......... 349/129; 349/130; 349/146; 349/114

(58) Field of Classification Search ................. 349/114, 349/146, 144, 129, 130, 178
See application file for complete search history.

(56) References Cited

U.S. PATENT DOCUMENTS 2,218,363 A 10/1940 Sundholm
4,385,806 A 5/1983 Fergason
4,632,514 A 12/1986 Ogawa
5,085,973 A 2/1992 Shimizu
(Continued)

FOREIGN PATENT DOCUMENTS

CN 1448764 A 10/2003
(Continued)

OTHER PUBLICATIONS

First Examination Report for Chinese Patent Application No. 200510072215.5 mailed Apr. 13, 2007 with English Translation.

(Continued)

*Primary Examiner* — Thoi Duong
(74) *Attorney, Agent, or Firm* — Cantor Colburn LLP

(57) ABSTRACT

A vertical alignment liquid crystal layer is sealed between a first substrate having a first electrode and a second substrate having a second electrode, each pixel region has a reflective region and a transmissive region, and a gap adjusting section is provided on one of sides of the first substrate and the second substrate which sets a thickness (gap) of the liquid crystal layer which controls a phase difference of incident light to the liquid crystal layer so that a gap in the reflective region is smaller than a gap in the transmissive region. An alignment controller which divides alignment of the liquid crystal within a pixel region is provided in the pixel region on at least one of the sides of the first substrate and the second substrate. It is also possible to optimize by changing the gap in red, green, and blue.

9 Claims, 19 Drawing Sheets

U.S. PATENT DOCUMENTS 5,150,235 A 9/1992 Haim
5,666,179 A 9/1997 Koma
6,016,178 A 1/2000 Kataoka
6,195,140 B1 2/2001 Kubo
6,356,335 B1 * 3/2002 Kim et al. .................... 349/156
6,512,568 B2 * 1/2003 Song et al. .................... 349/143
6,567,143 B1 5/2003 VanderPloeg
6,650,390 B2 * 11/2003 Sakamoto et al. ............ 349/143
6,661,484 B1 12/2003 Iwai
6,724,452 B1 4/2004 Takeda
6,759,172 B2 7/2004 Huh
6,836,308 B2 12/2004 Sawasaki
6,842,207 B2 1/2005 Nishida
6,850,302 B2 * 2/2005 Song ............................ 349/129
6,947,110 B2 9/2005 Morimoto
7,072,015 B2 7/2006 Maeda
7,113,238 B2 9/2006 Okumura
7,218,363 B2 5/2007 Ozawa
7,271,866 B2 9/2007 Ozawa
7,405,789 B1 7/2008 Sasaki
7,446,841 B2 11/2008 Jun
2001/0024257 A1 9/2001 Kubo
2002/0080320 A1 6/2002 Suzuki
2002/0149728 A1 10/2002 Ogishima
2003/0016324 A1 1/2003 Jisaki
2003/0128317 A1 7/2003 Ohmuro
2003/0151712 A1 8/2003 Inoue
2003/0160928 A1 8/2003 Ozawa
2003/0223027 A1 12/2003 Chen
2004/0004686 A1 1/2004 Ogawa
2004/0070714 A1 4/2004 Ishii
2004/0125292 A1 7/2004 Maeda
2004/0135949 A1 7/2004 Maeda
2005/0001962 A1 1/2005 Maeda
2005/0270449 A1 12/2005 Koma
2005/0270462 A1 12/2005 Koma
2006/0103785 A1 5/2006 Yamada
2006/0103786 A1 5/2006 Koma
2006/0203157 A1 9/2006 Ozawa

FOREIGN PATENT DOCUMENTS

CN 1573430 A 2/2005
CN 2711770 Y 7/2005
EP 1484633 A1 12/2004
JP 60-159823 A 8/1985
JP 11-52381 A 2/1999
JP 11-101992 A 4/1999
JP 11-242225 A 9/1999
JP 11-352488 A 12/1999
JP 2000-155317 A 6/2000
JP 2000-356771 A 12/2000
JP 2002-55343 A 2/2002
JP 2002-287158 A 10/2002
JP 2002-350853 A 12/2002
JP 2003-43488 A 2/2003
JP 2003-167253 A 6/2003
JP 2003-186030 A 7/2003
JP 2003-202594 A 7/2003
JP 2003-255378 A 9/2003
JP 2003-255399 A 9/2003
JP 2003-295165 A 10/2003
JP 2003-295177 A 10/2003
JP 2003-344839 A 12/2003
JP 2003-344860 A 12/2003
JP 2004-69767 A 3/2004
JP 2004-198929 A 7/2004
JP 2006-11362 A 1/2006
KR 1994-0023948 A 11/1994
KR 2003-0058012 A 7/2003
KR 10-2004-0025626 A 3/2004
KR 10-2004-0025869 A 3/2004
KR 10-2004-0041058 A 5/2004
KR 10-2004-0041060 A 5/2004

OTHER PUBLICATIONS

Second Examination Report for Chinese Patent Application No. 200510072215.5 mailed Nov. 16, 2007 with English translation.

Japanese Office Action for Japanese Application No. 2009-012226 mailed Jul. 6, 2010 with English translation.

Japanese Office Action for Japanese Application No. 2004-347905 mailed Jul. 6, 2010 with English translation.

Form PTO-892 from U.S. Office Action dated Apr. 5, 2010.

* cited by examiner

TRANSFLECTIVE LIQUID CRYSTAL DISPLAY DEVICE AND COLOR LIQUID CRYSTAL DISPLAY DEVICE

CROSS REFERENCE TO RELATED APPLICATIONS

The present application is a continuation application of U.S. patent application Ser. No. 12/491,744, filed on Jun. 25, 2009, which is a continuation application of U.S. patent application Ser. No. 11/132,767, filed on May 19, 2005, the entire contents of which are incorporated herein by reference. The Ser. No. 12/491,744 application and the Ser. No. 11/132,767 application claimed priority to the earlier filed Japanese Patent Application No. 2004-347905 filed Nov. 30, 2004, priority to which is also claimed herein.

BACKGROUND OF THE INVENTION

1. Field of the Invention

The present invention relates to a transflective (semitransmissive) liquid crystal display device in which both a reflective region and a transmissive region are provided in each pixel.

2. Description of the Related Art

Because liquid crystal display (hereinafter simply referred to as "LCD") devices have advantages such as thin thickness and low power consumption, the LCD devices are currently widely in use as a computer monitor and a monitor for a portable information device. In an LCD, liquid crystal is sealed between a pair of substrates and alignment of the liquid crystal positioned between the substrates is controlled by electrodes formed on the substrates to realize a display. Unlike CRT (Cathode Ray Tube) display devices and electroluminescence (hereinafter simply referred to as "EL") display devices, fundamentally, the LCD is not self-emissive, and, therefore, requires a light source for displaying an image for an observer.

In a transmissive LCD, a transparent electrode is employed as the electrodes to be formed on the substrates, a light source is provided at the back or side of a liquid crystal display panel and an amount of transmission of light from the light source is controlled in the liquid crystal panel to achieve a bright display even in a dark surroundings. However, because the light source is always being switched on to achieve display, power consumption by the light source is unavoidable, and, moreover, there is a disadvantage that sufficient contrast cannot be secured in an environment with intense ambient light such as outdoors during daytime.

In a reflective LCD, on the other hand, ambient light such as the sun and the indoor light is used as the light source. The ambient light entering the liquid crystal panel is reflected by a reflective electrode formed on a substrate on a side of a non-observation surface. A display is realized by controlling, for each pixel, the amount of emission light from the liquid crystal panel of the light which enters the liquid crystal layer and is reflected by the reflective electrode. Because the reflective LCD uses the ambient light as the light source, no power is consumed by the light source unlike the transmissive LCD and, consequently, has a very low power consumption. The reflective LCD has a characteristic that a sufficient contrast can be obtained when the environment is bright such as the outdoors, but the display cannot be viewed when there is no ambient light.

Recently, a transflective (semitransmissive) LCD has been proposed and attracted much attention as a display that can easily be seen outdoors and also in a dark environment. The transflective LCD has both a reflective function and a transmissive function as shown in, for example, Japanese Patent Laid-Open Publication No. Hei 11-101992 and Japanese Patent Laid-Open Publication No. 2003-255399. In a transflective LCD, a transmissive region and a reflective region are provided within a pixel region to obtain both the transmissive function and the reflective function.

Because the transflective LCDs have superior visibility both outdoors and under dark environment, the use of the transflective LCD as a display, for example, of a portable information device is very effective.

However, in a portable information device, various viewing conditions can be considered, and the viewing angle must be widened in order to achieve display of high quality in any of the various viewing conditions (in particular, various viewing angles).

In addition, in a transflective LCD, because the semi-transmissivity is achieved by dividing a pixel into a transmissive region and a reflective region, the transmission characteristic and the reflection characteristic are lower than that in the transmissive LCD and that in the reflective LCD, respectively. Therefore, in order to improve the display quality in each display region (transmissive region and reflective region), it is necessary to achieve a higher contrast in both regions.

However, in the field of transflective LCDs, efforts have been devoted for improving a structure for realizing both a transmissive mechanism and the reflective mechanism in one structure, and attempts have not been made for improvement in the display quality such as widening of the viewing angle and improvement of the contrast.

SUMMARY OF THE INVENTION

The present invention advantageously provides a transflective LCD and a color LCD with a high display quality.

According to one aspect of the present invention, there is provided a transflective LCD comprising a plurality of pixels, and a vertical alignment liquid crystal layer which is sealed between a first substrate having a first electrode and a second substrate having a second electrode, wherein each pixel region comprises a reflective region and a transmissive region, the reflective region comprises a gap adjusting section, on at least one of sides of the first substrate and the second substrate, which sets a gap defined by a thickness of the liquid crystal layer which controls a phase difference of light incident on the liquid crystal layer so that the gap is smaller in the reflective region than in the transmissive region, and the pixel region comprises an alignment controller which divides an alignment direction of the liquid crystal within the pixel region on at least one of the sides of the first substrate and the second substrate.

In this manner, by using a vertical alignment liquid crystal layer in a transflective LCD, the responsiveness can be improved compared to, for example, well-known TN (Twisted Nematic) liquid crystal and a display of a high contrast can be realized. In addition, in vertical alignment liquid crystal, the alignment of the liquid crystal is controlled to be in parallel or perpendicular to a plane of the substrate as opposed to the TN liquid crystal or the like in which a pre-tilt is applied and the alignment is controlled. Because of this structure, the viewing angle dependency is fundamentally low and the viewing angle can be widened compared to TN liquid crystal. In addition, in the present invention, an alignment controller for dividing the alignment direction of the liquid crystal within a pixel region is provided within a pixel region, even when the LCD is observed from various angles, a possibility that the observation position is within an optimum range of viewing angles of the various divided regions is high, and thus, it is possible to further widen the viewing angle of the pixel. Therefore, even when the environment is dark or bright, it is possible to realize a display which is highly responsive, has a wide viewing angle, and has a high contrast ratio.

Even in a simple calculation, it can be seen that a total optical path length within the liquid crystal layer differs in the reflective region in which the incident light is transmitted through the liquid crystal layer twice and in the transmissive region in which the incident light is transmitted only once. By providing a gap adjusting section within a pixel region, an optimum thickness of the liquid crystal layer (cell gap) can be obtained in the reflective region and in the transmissive region. Therefore, coloring does not occur in the reflective region or in the transmissive region and an optimum reflectivity and transmissivity can be achieved. Therefore, it is possible to achieve a display which is bright and has a superior color reproducibility.

According to another aspect of the present invention, it is preferable that, in the transflective LCD, the alignment controller comprises an electrode absent section which is formed in at least one of the first electrode and the second electrode.

According to another aspect of the present invention, it is preferable that, in the transflective LCD, the alignment controller comprises a projection which projects toward the liquid crystal layer from at least one of the sides of the first substrate and the second substrate. Alternatively, both the electrode absent section and the projection may be provided in a pixel region as the alignment controller.

According to another aspect of the present invention, it is preferable that, in the transflective LCD, an end surface of the gap adjusting section in the pixel region functions as the alignment controller.

According to another aspect of the present invention, it is preferable that, in the transflective LCD, an angular difference between an alignment direction of the liquid crystal controlled by the alignment controller in the pixel region and an alignment direction of the liquid crystal controlled by another alignment controller having a projection line which intersects a projection line of the alignment controller onto a plane of the substrate is less than 90 degrees.

By achieving an angular difference of less than 90 degrees, it is possible to reliably prevent problems such as generation of asperity in display due to generation of a disclination line (boundary of regions having different alignment directions) in an uncertain position within a pixel divided by the alignment controller.

According to another aspect of the present invention, it is preferable that, in the transflective LCD, the plurality of pixels include a pixel for red, a pixel for green, and a pixel for blue, and the gap in at least one of the transmissive region and the reflective region of each pixel of at least one of the pixel for red, pixel for green, and pixel for blue differs from the gap in the pixels of other colors.

In the pixels for red, green, and blue, transmittances of light having different colors (R, G, and B), that is, different wavelengths, are controlled by the liquid crystal layer. Therefore, the optimum gap (thickness of the liquid crystal layer) may differ from each other depending on the wavelengths to be transmitted. In such a case, by changing the gap of R, G, or B pixel to be different from the gap of the other colors, it is possible to easily obtain a full-color LCD having a low wavelength dependency and a superior color reproducibility. In addition, because the wavelength dependency can be reduced, identical driving conditions can be used for each pixel, allowing for reduction in processing load of the driver circuit.

According to another aspect of the present invention, it is preferable that, in the transflective LCD, a quarter wavelength plate and a half wavelength plate are provided on the first substrate and the second substrate.

By providing both a quarter wavelength plate and a half wavelength plate, combining the wavelength plates with a linear polarizer plate, and using the combined structure as a wide wavelength band circular polarizer plate, it is possible to more reliably obtain required circular polarization for the vertical alignment liquid crystal layer for all of the R, G, and B light having different wavelengths, allowing for a further reduction of the wavelength dependency of the LCD.

According to another aspect of the present invention, it is preferable that, in the transflective LCD, of the first substrate and the second substrate, a substrate opposing a substrate which is placed near a light source comprises a phase difference plate having a negative refractive index anisotropy.

By providing a phase difference plate (negative retarder) having a negative refractive index anisotropy (optical anisotropy), it is possible to apply optical compensation for the vertical alignment liquid crystal layer (liquid crystal cell), allowing for a further widening of the viewing angle of the LCD.

According to another aspect of the present invention, it is preferable that, in the transflective LCD, a biaxial phase difference plate is provide on at least one of the first substrate and the second substrate. By using the biaxial phase difference plate, it is possible to realize, with one phase difference plate, the functions of, for example, a combination of the negative retarder and the quarter wavelength plate and the negative retarder and the half wavelength plate, to reduce the thickness and to minimize the optical loss.

According to another aspect of the present invention, it is preferable that, in the transflective LCD, a plurality of the first electrodes are formed on the side of the first substrate each in an individual pattern for each pixel, a thin film transistor is connected to each of the plurality of first electrodes, the second electrode formed on the side of the second substrate is formed as a common electrode which is common to the plurality of pixels, and the gap adjusting section is formed on the side of the second substrate.

By forming the gap adjusting section on the side of the second substrate, it is possible to form the first substrate side through steps that are common for the plurality of pixels even when a thin film transistor is to be formed on the first substrate side. Thus, it is possible to form the gap adjusting section on the side of the second substrate having a simpler structure than the first substrate simultaneously with the manufacturing of the first substrate having a long total manufacturing time because the first substrate has a larger number of elements, allowing for improvement in the manufacturing efficiency.

According to another aspect of the present invention, there is provided a transflective liquid crystal display device comprising a plurality of pixels, and vertical alignment liquid crystal which is sealed between a first substrate having a first electrode and a second substrate having a second electrode, wherein each pixel region comprises a reflective region and a transmissive region, a gap adjusting section which sets a gap defined by a thickness of the liquid crystal layer which controls a phase difference of light incident on the liquid crystal layer to be smaller in the reflective region than that in the transmissive region is provided on at least one of sides of the first substrate and the second substrate, and a side surface of the gap adjusting layer has a forward tapered shape in which the width increases toward the substrate on which the gap adjusting layer is formed.

In this manner, by employing a forward tapered shape in the side surface of the gap adjusting layer, it is possible to prevent disturbance in the alignment of the liquid crystal at the side surface and to use the side surface as an inclined surface for controlling the alignment.

As described, in the present invention, the viewing angle can be widened and the contrast and the response speed can be improved in a transflective LCD, allowing for realization of an LCD having a high display quality.

According to another aspect of the present invention, there is provided a vertical alignment liquid crystal display device having pixels for red, green, and blue for displaying three primary colors of red, green, and blue, the vertical alignment liquid crystal display device comprising a first substrate on which a pixel electrode is formed for each pixel, a second substrate which is placed opposing the first substrate and which has a common electrode, liquid crystal which is sealed between the first substrate and the second substrate and which has a negative dielectric constant anisotropy, a red color filter layer, a green color filter layer, and a blue color filter layer which are placed on the second substrate corresponding to the pixels for red, green, and blue, a first vertical alignment film which is formed covering the pixel electrode, and a second vertical alignment film which is formed closer to the liquid crystal than are the common electrode, the red color filter layer, the green color filter layer, and the blue color filter layer, wherein a condition of D-blue≧D-green>D-red is satisfied wherein D-red is a thickness of the red color filter layer, D-green is a thickness of the green color filter layer, and D-blue is a thickness of the blue color filter layer.

According to another aspect of the present invention, there is provided a vertical alignment liquid crystal display device having pixels for red, green, and blue for displaying three primary colors of red, green, and blue, the vertical alignment liquid crystal display device comprising a first substrate on which a pixel electrode is formed for each pixel, a second substrate which is placed opposing the first substrate and which has a common electrode, liquid crystal which is sealed between the first substrate and the second substrate and which has a negative dielectric constant anisotropy, a red color filter layer, a green color filter layer, and a blue color filter layer which are placed on the second substrate corresponding to the pixels for red, green, and blue, a gap layer which is selectively formed on the green color filter layer and the blue color filter layer, a first vertical alignment film which is formed covering the pixel electrode, and a second vertical alignment film which is formed closer to the liquid crystal than are the common electrode, the red color filter layer, the green color filter layer, the blue color filter layer, and the gap layer.

By employing such a relationship and a structure, it is possible to realize a display of low power consumption and without coloring for any of three primary colors of red, green, and blue, in a color vertical alignment liquid crystal display device having pixels for displaying red, green, and blue.

BRIEF DESCRIPTION OF THE DRAWINGS

Preferred embodiments of the present invention will be described in detail based on the following drawings, wherein.

DESCRIPTION OF PREFERRED EMBODIMENTS

Figure 1:
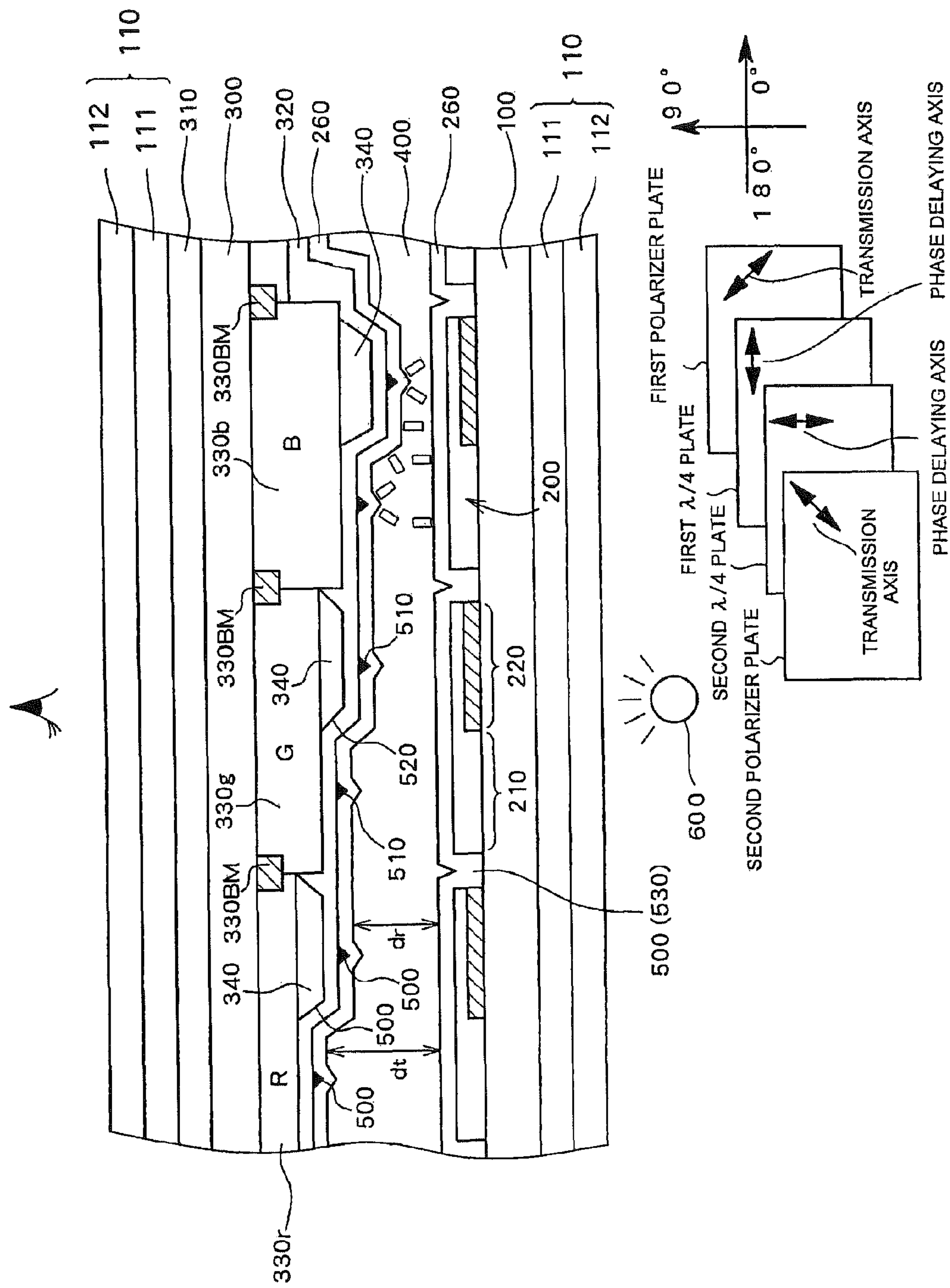
FIG. 1 is a diagram schematically showing a cross sectional structure of a vertical alignment transflective LCD according to a first preferred embodiment of the present invention.

Preferred embodiments (hereinafter simply referred to as "embodiments") of the present invention will now be described referring to the drawings.

First Preferred Embodiment

FIG. 1 schematically shows a cross sectional structure of a transflective active matrix LCD which is used as the transflective LCD according to a first preferred embodiment of the present invention. The transflective LCD according to the first preferred embodiment comprises a plurality of pixels, wherein a first substrate and a second substrate on which a first electrode 200 and a second electrode 320 are formed respectively on a side opposing each other are adhered to each other with a liquid crystal layer 400 therebetween, and a transmissive region 210 and a reflective region 220 are formed in each pixel region.

A vertical alignment liquid crystal having a negative dielectric constant anisotropy is used as the liquid crystal layer 400 and an alignment controller 500 (alignment divider) for dividing a pixel region into a plurality of alignment regions is provided on the side of the second substrate or on the side of the first substrate. As shown in FIG. 1, the alignment controller 500 comprises, for example, a projection 510 which projects toward the liquid crystal layer 400, an inclined section 520, and an electrode absent section which is formed in FIG. 1 by a gap between pixel electrodes 200 (details will be described later).

A transparent substrate such as glass is used for the first substrate 100 and the second substrate 300. On the side of the first substrate 100, a pixel electrode 200 in which a transparent conductive metal oxide such as an ITO (Indium Tin Oxide) and IZO (Indium Zinc Oxide) is used is formed in an individual pattern for each pixel as a first electrode and a switching element (not shown; refer to a description of FIG. 5 to be described later) such as a thin film transistor which is connected to the pixel electrode 200 is formed. Over the entire surface of the first substrate 100, an alignment film 260 for vertical alignment is formed over the pixel electrode 200. As the alignment film 260, for example, polyimide or the like is used, and, in the present embodiment, a rubbingless type alignment film is used so that the initial alignment of the liquid crystal (alignment when no voltage is applied) is set to be perpendicular (vertical) to the plane direction of the film. With a structure shown in FIG. 5 (details to be described later), a transparent region 210 which is made solely of the transparent electrode and a reflective region 220 in which a reflective film or a reflective electrode which is layered to the transparent electrode is formed can be provided in a formation region of one pixel electrode 200.

On the second substrate 300 which is adhered to the first substrate 100 with the liquid crystal layer 400 therebetween, a red color filter 330*r*, a green color filter 330*g*, and a blue color filter 330*b* are formed on a surface facing the liquid crystal at predetermined corresponding positions. In a gap between the color filters 330*r*, 330*g*, and 330*b* (gap between pixel regions), a light shielding layer (in the embodiment, a black color filter) 330BM for preventing leak of light between pixels is provided.

A gap adjusting section 340 made of an optically transmissive material is formed on the color filters 330*r*, 330*g*, and 330*b* in order to set the thickness (cell gap) dr of the liquid crystal layer in the region of the pixel opposing the reflective region 220 to be smaller than the thickness (cell gap) dt of the liquid crystal layer in the transmissive region 210 (that is, dr<dt). The thickness of the gap adjusting section 340 corresponds to a case in which the thickness d of the liquid crystal layer required for obtaining optimum transmittance and optimum reflectance in the transmissive region 210 in which the incident light is transmitted through the liquid crystal layer 400 once and in the reflective region 220 in which the incident light is transmitted through the liquid crystal layer 400 twice differs from each other. Thus, for example, a thickness d of the liquid crystal layer is determined to obtain an optimum transmittance in the transmissive region 210 in which no gap adjusting section 340 is provided and a gap adjusting section 340 having a desired thickness is formed in the reflective region 220 to obtain a thickness d of the liquid crystal layer which is smaller than that in the transmissive region 210.

An electrode 320 common to the plurality of pixels (common electrode) is formed as a second electrode covering the entire surface of the second substrate 300 including the gap adjusting section 340. Similar to the pixel electrode 200, a transparent conductive metal oxide such as ITO and IZO can be used to form the common electrode 320.

In the present embodiment, a projection 510 is formed above the common electrode 300 as the alignment controller 500 for dividing the alignment direction of the liquid crystal within a pixel region to form a plurality of region having different alignment directions. The projection 510 projects toward the liquid crystal layer 400 and may be conductive or insulating. In the present embodiment, an acrylic resin, for example, which is insulating can be used and formed into a desired pattern. In addition, the projection 510 is formed both in the transmissive region 210 and the reflective region 220 within each pixel region.

An alignment film 260 which is of vertical alignment type similar to the alignment film on the first substrate side and which is rubbingless is formed covering the projection 510 and the common electrode 320. As described, the alignment film 260 aligns the liquid crystal along a direction perpendicular to the planar direction of the film. In positions covering the projection 510, an inclined surface reflecting the shape of the projection 510 is formed, and, therefore, in the formation positions of the projection 510, the liquid crystal is aligned along a direction perpendicular to the inclined surface of the alignment film 260 covering the projection 510, and, thus, the alignment direction of the liquid crystal is divided with the boundary at the projection 510. In addition, in the present embodiment, a side surface of the gap adjusting section 340 provided on the side of the second substrate is formed in a tapered shape so that an inclined surface is formed on the alignment film 260 covering above the gap adjusting section 340 reflecting the inclined surface of the gap adjusting section 340. In this inclined surface also, the liquid crystal is controlled in a direction perpendicular to the inclined surface and the inclined surface of the gap adjusting layer 340 also functions as the alignment controller 500.

In the transflective LCD shown in FIG. 1, a linear polarizer plate (first polarizer plate) 112 and a wide wavelength band quarter wavelength (λ/4) plate (first phase difference plate) 111 made of a combination of a quarter wavelength (λ/4) phase difference plate and a half wavelength (λ/2) phase difference plate are provided on the external side (side facing a light source 600) of the first substrate so that a wide wavelength band circular polarizer plate 110 is formed by the linear polarizer plate 112 and the phase difference plate 111.

On the external side (viewing side) of the second substrate 300, a phase difference plate 310 having a negative refractive index anisotropy is provided as an optical compensation plate, and a wide wavelength band quarter wavelength (λ/4)

plate (second phase difference plate) 111 made of a combination of a quarter wavelength (λ/4) plate and a half wavelength (λ/2) plate and a linear polarizer plate (second polarizer plate) 112 are provided so that a wide band circular polarizer plate 110 is formed by the linear polarizer plate 112 and the phase difference plate 111, similar to the structure on the first substrate side. The positional relationship among the optical members is, for example, as shown in the lower section of FIG. 1, in which an axis of the first polarizer plate is placed at 45 degrees, a phase delaying axis of the first quarter wavelength (λ/4) plate is placed at 90 degrees, a phase delaying axis of the second quarter wavelength (λ/4) plate is placed at 180 degrees, and an axis of the second polarizer plate is placed at 135 degrees.

Light emitted from the light source 600 transmits through the linear polarizer plate 112 on the side of the first substrate 100 and becomes linearly polarized light in a direction along the polarization axis of the polarizer plate 112. The light then becomes circularly polarized light when the phase difference is shifted by λ/4 in the first quarter wavelength (λ/4) plate 111. In the present embodiment, in order to reliably obtain circular polarization for any of the R, G, and B components at least having different wavelengths to increase the usage efficiency (transmittance) of light in the liquid crystal cell, both a quarter wavelength (λ/4) phase plate and a half wavelength (λ/2) phase plate are used to form the wide wavelength band quarter wavelength (λ/4) plate 111. The obtained circularly polarized light transmits through the pixel electrode 200 in the transmissive region 210 and enters the liquid crystal layer 400.

In the transflective LCD according to the present embodiment, vertical alignment liquid crystal having a negative dielectric constant anisotropy ($\Delta\in<0$) is used in the liquid crystal layer 400 and the alignment film 260 of a vertical alignment type is used.

Therefore, in a state in which no voltage is applied, the liquid crystal is aligned along a direction perpendicular to the planar direction of the alignment film 260, and, as the applied voltage increases, the direction of the major axis of the liquid crystal is tilted to be perpendicular to an electric field formed between the pixel electrode 200 and the common electrode 320 (parallel to the planar direction of the substrate). When no voltage is applied to the liquid crystal layer 400, the polarization state is not changed in the liquid crystal layer 400, the circularly polarized light reaches the second substrate 300, the circular polarization is removed by the second quarter wavelength (λ/4) plate 111, and the light becomes linearly polarized light. Because the second polarizer plate 112 is placed perpendicular to the direction of the linear polarization from the second quarter wavelength (λ/4) plate 111, the linearly polarized light cannot transmit through the second polarizer plate 112 having a transmission axis (polarization axis) which is perpendicular to that of the first polarizer plate 112, and, thus, the display becomes black.

When a voltage is applied to the liquid crystal layer 400, the liquid crystal layer 400 creates a phase difference with respect to the incident circularly polarized light to change the polarization, for example, to circular polarization of opposite revolution, an elliptical polarization, and linear polarization. Then, the second quarter wavelength (λ/4) plate 111 shifts the obtained light by a phase of λ/4 so that the polarization becomes linear polarization (parallel to the transmission axis of the second polarizer plate), elliptical polarization, and circular polarization. Because these polarizations each has a component along the polarization axis of the second polarizer plate 112, light of an amount corresponding to the component is emitted through the second polarizer plate 112 toward the viewing side and is recognized as the display (white or gray-scale).

The phase difference plate 310 is a negative retarder which can improve the optical characteristic when the LCD is seen from a tilted angle and can improve the viewing angle. Alternatively, it is also possible to employ a biaxial phase difference plate having both functions of the negative retarder (310) and the quarter wavelength (λ/4) plate 111 in place of the negative retarder 310 and the quarter wavelength (λ/4) plate 111. With this configuration, it is possible to reduce the thickness of the LCD and to improve the transmittance.

In the present embodiment, with the gap adjusting section 340 as described above, the thickness (cell gap) d of the liquid crystal layer 400 which substantially controls the transmittance of light is set to different desired gaps in the transmissive region 210 and the reflective region 220. A primary reason for employing this structure is that the numbers of transmission of light through the liquid crystal layer differ between the transmissive region 210 and in the reflective region 220 because in the transmissive region 210, display is realized by controlling an amount (transmittance) of light transmitted from the light source 600 provided on the backside of the LCD (on the side of the first substrate 100 in the illustrated example of FIG. 1) through the liquid crystal layer 400 and emitted from the side of the second substrate 300 to the outside, whereas in the reflective region 220, the display is realized by controlling an amount (reflectance of the LCD) of light incident from the viewing side of the LCD on the liquid crystal layer 400, reflected by a reflective film formed in the formation region of the pixel electrode 200, transmitted through the liquid crystal layer 400 again, and emitted to the viewing side from the side of the second substrate 300. In other words, in the reflective region 220, the light transmits through the liquid crystal layer 400 twice, and, therefore, the cell gap dr of the reflective region 220 must be set to a smaller value than the cell gap dt of the transmissive region 210. In the present embodiment, as shown in FIG. 1, the gap adjusting section 340 having a desired thickness is provided only in the reflective region 220 of each pixel in order to achieve the relationship of $dr<dt$. A material of the gap adjusting section 340 is not limited as long as the gap adjusting section 340 transmits light and can be formed in a desired thickness, and, for example, an acrylic resin or the like which is used also as a planarizing insulating layer may be used.

When the side surface of the gap adjusting section 340 is used as a part of the alignment controller 500 (inclined section 520) as described, the taper angle of the side surface of the gap adjusting section 340 must be less than 90 degrees with respect to the plane of the substrate. When the taper angle is 90 degrees or higher, the alignment of the liquid crystal is disturbed at the side surface of the gap adjusting section 340, and the coverage of the common electrode 320 and the alignment film 260 formed above the gap adjusting section 340 becomes insufficient. In addition, the side surface of the gap adjusting section 340 does not contribute to display itself. When the taper angle is too small, the area of the side surface of the gap adjusting section 340 becomes large, resulting in a reduction of the aperture ratio of the pixel, in particular, the aperture ratio of the reflective region in which a further improvement in the brightness is desired. Therefore, the taper angle of the side surface of the gap adjusting section 340 is preferably at an angle which does not reduce the coverage of the second electrode 320 and the alignment film 260 at the upper layers, which can divide the alignment of the liquid crystal, and which has a small reduction of the aperture ratio. Specifically, the taper angle is preferably within a range of 30 degrees-80 degrees.

As the gap adjusting section 340 having an inclined section 520 with a taper angle in such a range, it is possible to use, for example, the acrylic resin as described above, with a photosensitive agent. By adjusting the amount of polymerization starter and optically polymerizing monomer to be added to the acrylic resin as the gap adjusting material corresponding to the manufacturing conditions and characteristics of the exposure device, it is possible to obtain an arbitrary forward taper angle. As an alternative method of obtaining a forward tapered side surface for the gap adjusting section 340 other than the method of adjusting the amount of contained material, it is also possible to, for example, use optical polymerization inhibiting effect by oxygen present in the surroundings, enlargement of a pattern by diffraction of light during the exposure, melt flow by resin baking, etc., or a combination of these methods, to obtain a forward taper of a desired angle.

The optical polymerization inhibiting effect is obtained by oxygen in the atmosphere near the surface of the gap adjusting section 340. In contrast, at the side of the substrate away from the surface, the amount of oxygen is small, and, thus, polymerization is not inhibited and a hardening process proceeds. Therefore, the side of the surface of the planarizing insulating layer 38 is easier to be removed during development, resulting in a forward taper having a narrower width as the distance from the substrate increases.

The diffraction of light at the exposure depends on the exposure device. In a proximity exposure device, for example, the fact that the diffraction is large is utilized to form a taper in the gap adjusting section 340 by a region in which the gap adjusting section is formed and a region in which the gap adjusting section is removed.

In the melt flow, after the development, the gap adjusting section 340 is baked, for example, at a temperature of 80° C.-180° C. for 1 min. to 20 min. (for example, 120° C. and 8 min.) to melt the upper surface and side surface of the gap adjusting section 340 so that the surface is smoothened and a forward taper is formed by the side surface being melted and a shape change depending on the surface tension of the material.

As an organic material used in the gap adjusting section, materials are known which show sensitivity to a g ray (436 nm), h ray (405 nm), and i ray (248 nm) of an exposure light source. Many of organic materials showing sensitivity to the i ray result in a taper angle of 90 degrees or higher (reverse taper). In consideration of this, in the present embodiment, an acrylic resin having a sensitivity to the g ray and h ray and which tends to result in a forward taper is used as the material of the gap adjusting section.

In addition to changing the thickness d of the liquid crystal layer between the transmissive region 210 and the reflective region 220 in a pixel region, in the present embodiment, the thickness d of the liquid crystal layer is changed among the pixels for R, G, and B having different wavelengths (however, a common gap may be employed for red, green, and blue depending on the characteristics of the LCD). In the illustrated structure of FIG. 1, the gap for all of red, green, and blue is realized by changing the thicknesses of the red color filter **330*r*, green color filter 330*g*, and blue color filter 330*b* which are formed on the side of the second substrate 300. The present embodiment is not limited to a structure in which the thickness of the color filter is changed, and it is also possible to provide the gap adjusting section 340 also in the transmissive region 210 with the thickness of the gap adjusting section 340 being different in the transmissive region 210 and reflective region 220** for red, green, and blue. The present invention is not limited to a structure in which the thickness d of the liquid crystal layer in all of red, green, and blue differs from each other, and it is also possible to employ a configuration, for example, in which the green and blue pixels have the same thickness of the liquid crystal layer and only the red pixel has a different thickness, or a configuration in which only the blue pixel has a different thickness d, depending on the characteristics of the LCD.

Figure 2:
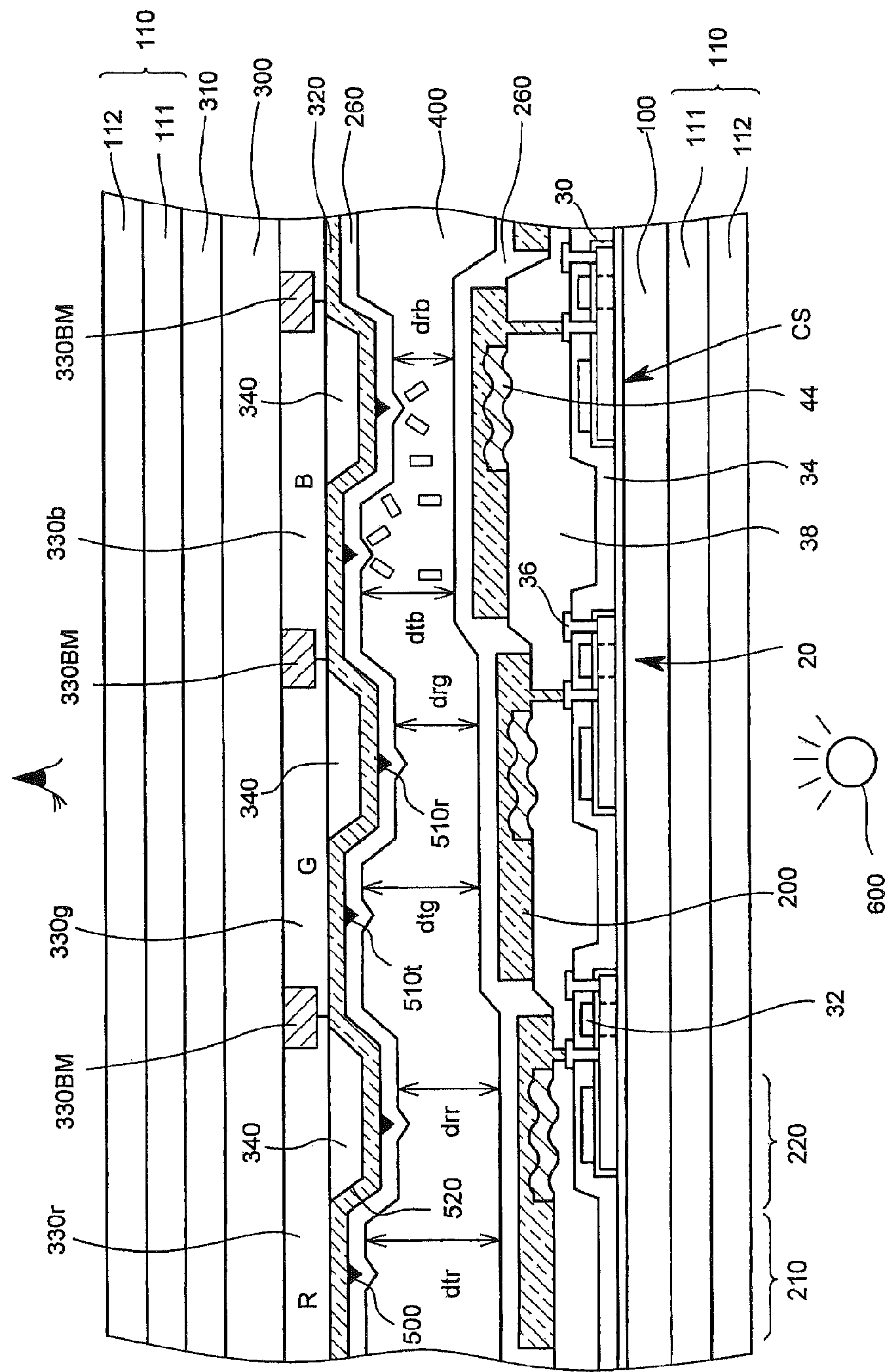
FIG. 2 is a diagram schematically showing another cross sectional structure of a vertical alignment transflective LCD according to a first preferred embodiment of the present invention.

FIG. 2 shows another structure for obtaining a different gap among pixels for red, green, and blue (in the description of FIG. 2, the structures common to those in FIG. 1 will not be described again). In the structure of FIG. 2, the gaps for red, green, and blue are not changed at the second substrate side, but rather, the thickness of the planarizing insulating layer 38 which is formed below the pixel electrode 200 is adjusted for red, green, and blue at the side of the first substrate 100. As a method for changing the thickness of the planarizing insulating layer 38, for example, it is possible to form the planarizing insulating layer 38 with different thicknesses for pixels for red, green, and blue without adding an extra step by exposing a planarizing insulating material containing a photosensitive material using one or a plurality of half-exposure mask having an amount of opening corresponding to the target thickness. In FIG. 2, projections and depressions are formed on the surface of the planarizing insulating layer 38 in the reflective region. The projections and depressions on the surface of the planarizing insulating layer 38 can be transferred to the reflective layer 44 formed on the planarizing insulating layer 38 in the reflective region so that projections and depressions are created on the surface of the reflective layer 44 to scatter the light incident on the liquid crystal layer to improve the display quality in the reflective region. Similar to the above-described process to obtain different thicknesses of planarizing insulating layer 38 in red, green, and blue, it is possible to employ the half-exposure to form the projections and depressions on the planarizing insulating layer 38 in the reflective region and a contact hole to be formed through the planarizing insulating layer 38 for connecting the pixel electrode 200 and the TFT simultaneously with formation of the planarizing insulating layer 38 without adding a step.

Figure 3:
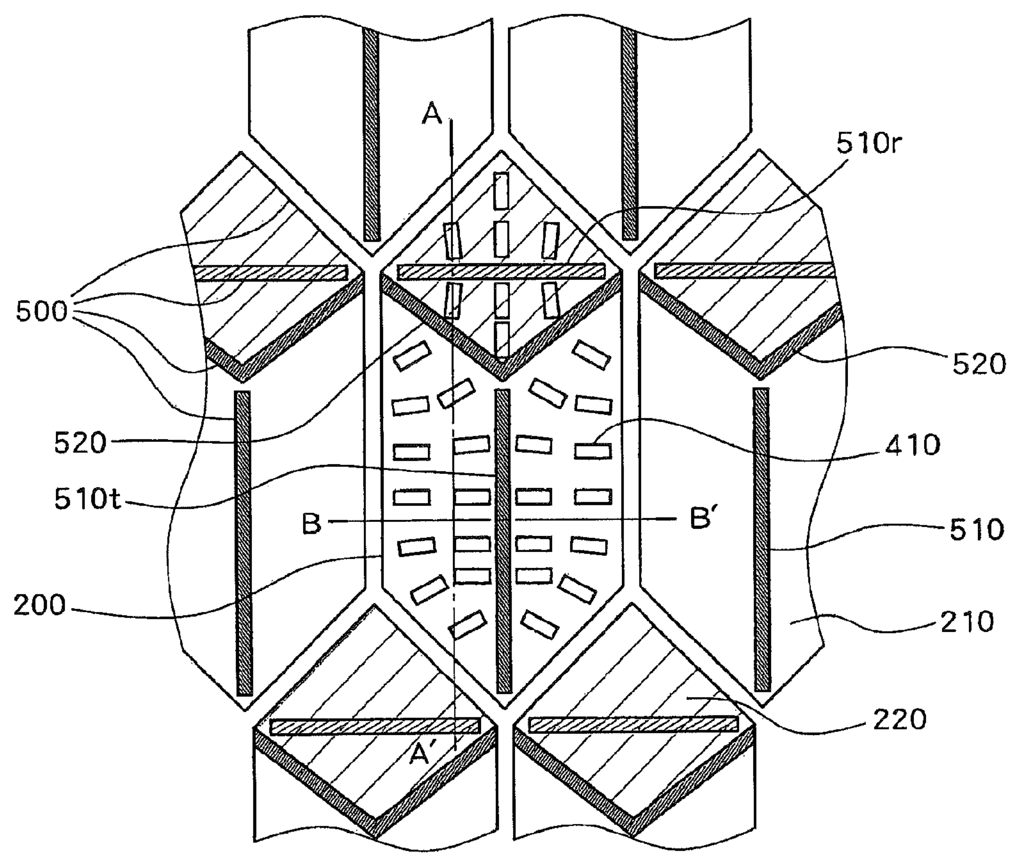
FIG. 3 is a diagram schematically and more specifically showing a planar structure of a transflective LCD according to a first preferred embodiment of the present invention.
Figure 5:
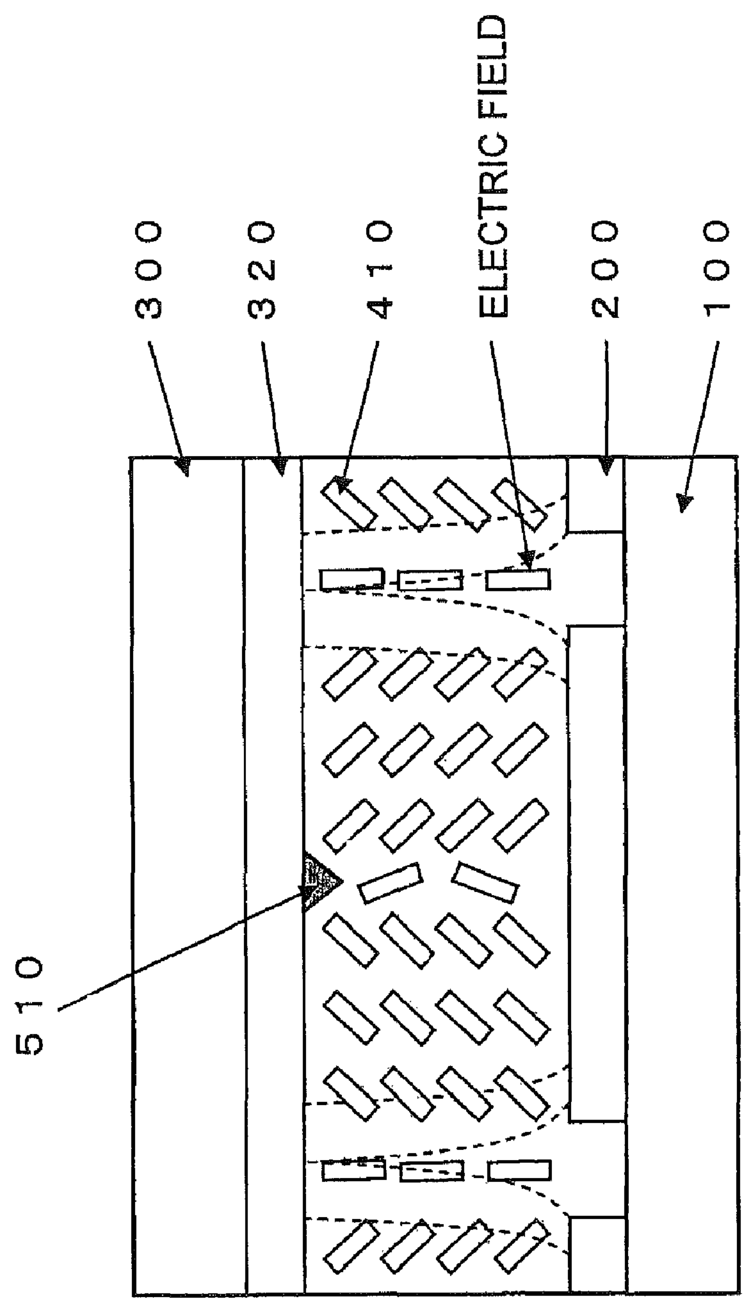
FIG. 5 is a diagram schematically showing a cross sectional structure of a transflective LCD along the B-B' line of FIG. 3.
Figure 6:
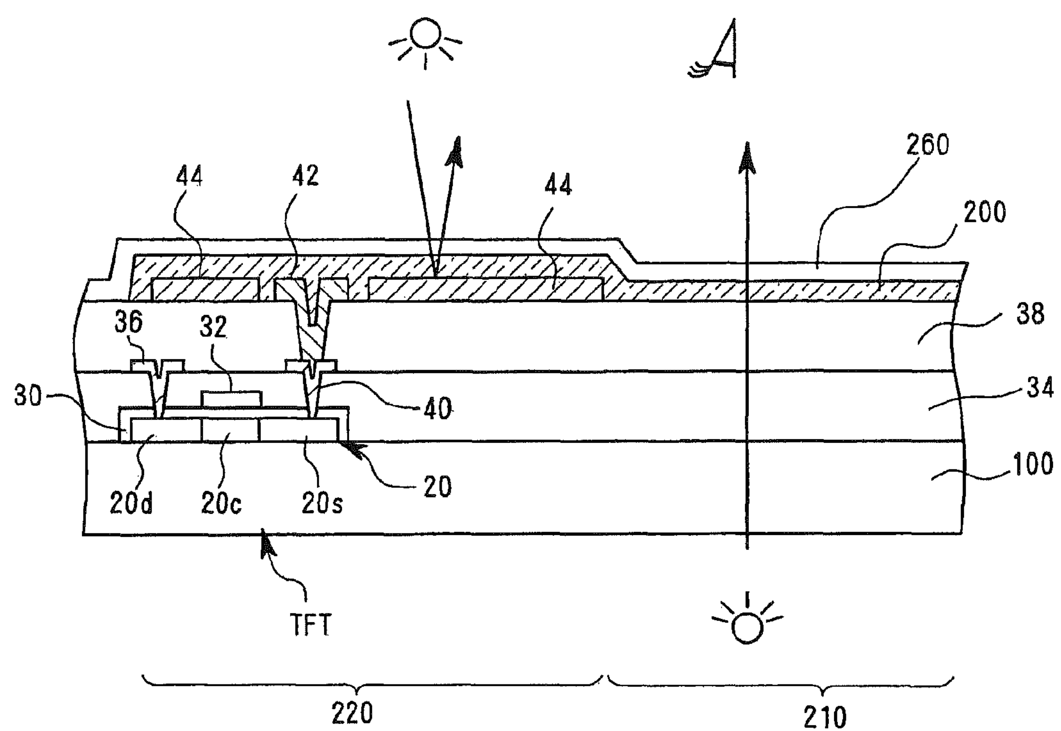
FIG. 6 is a schematic cross sectional diagram showing a structure of a pixel electrode and a TFT connected to the pixel electrode in a transflective LCD of FIG. 3.

Next, a more specific structure of each pixel of the transflective LCD according to the present embodiment will be described. FIG. 3 schematically shows an example planar structure of a transflective LCD according to the present embodiment, FIG. 4 schematically shows a cross sectional structure along the A-A' line of FIG. 3, FIG. 5 schematically shows a cross sectional structure along the B-B' line of FIG. 3, and FIG. 6 shows a more specific structure of the pixel electrode 200 and the thin film transistor or the like connected to the pixel electrode 200 of FIG. 3.

In the planar structure shown in FIG. 3, a pixel electrode 200 formed in an individual pattern for each pixel has a hexagonal pattern elongated along the vertical scan direction of the screen (vertical direction in FIG. 3). As shown in FIG. 3, a reflective film is selectively formed in a quadrangular (in FIG. 3, rhombus-shaped or square-shaped) region surrounded by diagonal lines including two upper sides in the longitudinal direction to form a reflective region 220. The remaining region of the hexagonal pixel electrode 200 having a chevron shape forms the transmissive region 210.

Figure 4:
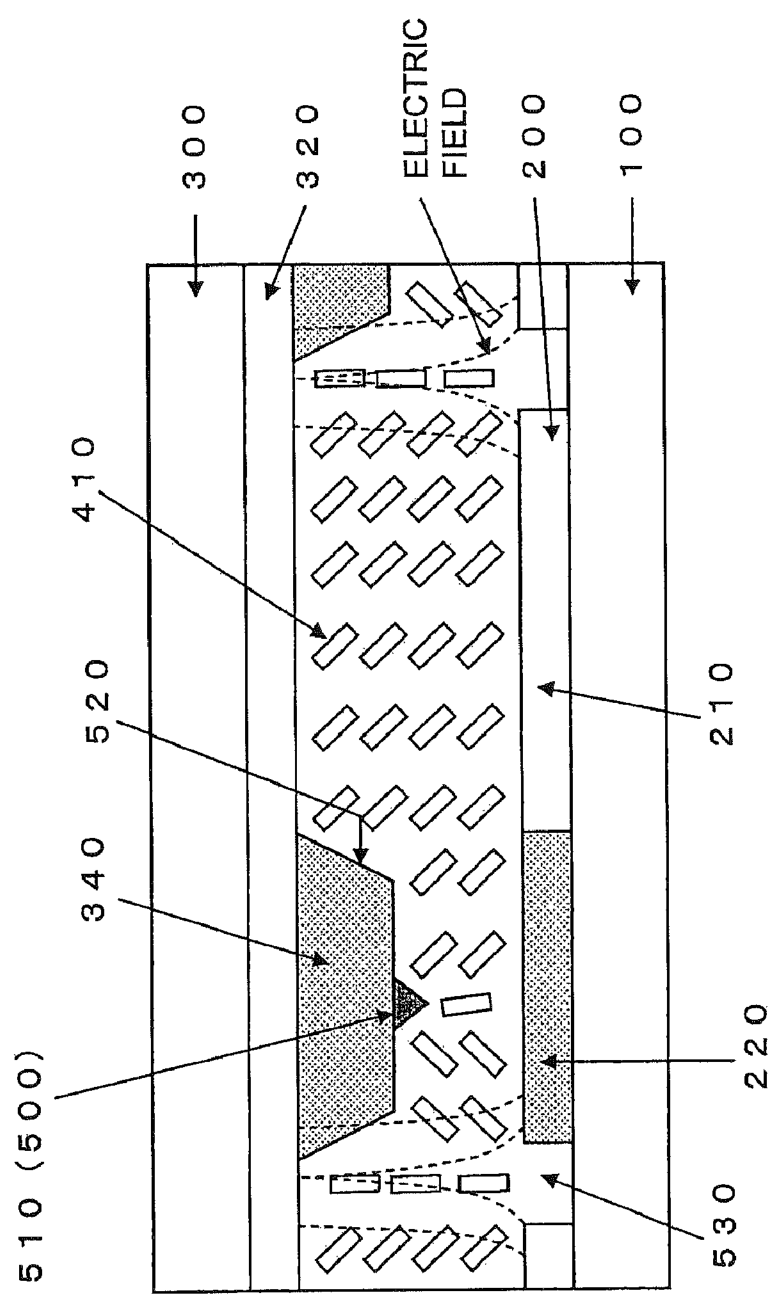
FIG. 4 is a diagram schematically showing a cross sectional structure of a transflective LCD along the A-A' line of FIG. 3.

As is clear from FIG. 4, in the reflective region 220, a gap adjusting layer 340 is formed above the second substrate 300, above the common electrode 320 in FIG. 4, in order to set the thickness (cell gap) dr of the liquid crystal layer to be smaller than the gap dt in the transmissive region 210.

An end of the gap adjusting layer 340 within a pixel is placed at a position along two lower sides of the quadrangular reflective region 220 which are almost linearly symmetrical with the two upper sides of the hexagonal pixel electrode 200. In addition, a projection 510*r* having a triangular cross section is formed connecting vertices of the quadrangular reflective region 220 opposing along the horizontal scan direction (horizontal direction in FIG. 3) and above the second substrate 300 (more specifically, above the gap adjusting section 340 in FIG. 4) to divide the reflective region 220 into an upper region and a lower region along the horizontal scan direction.

Figure 8:
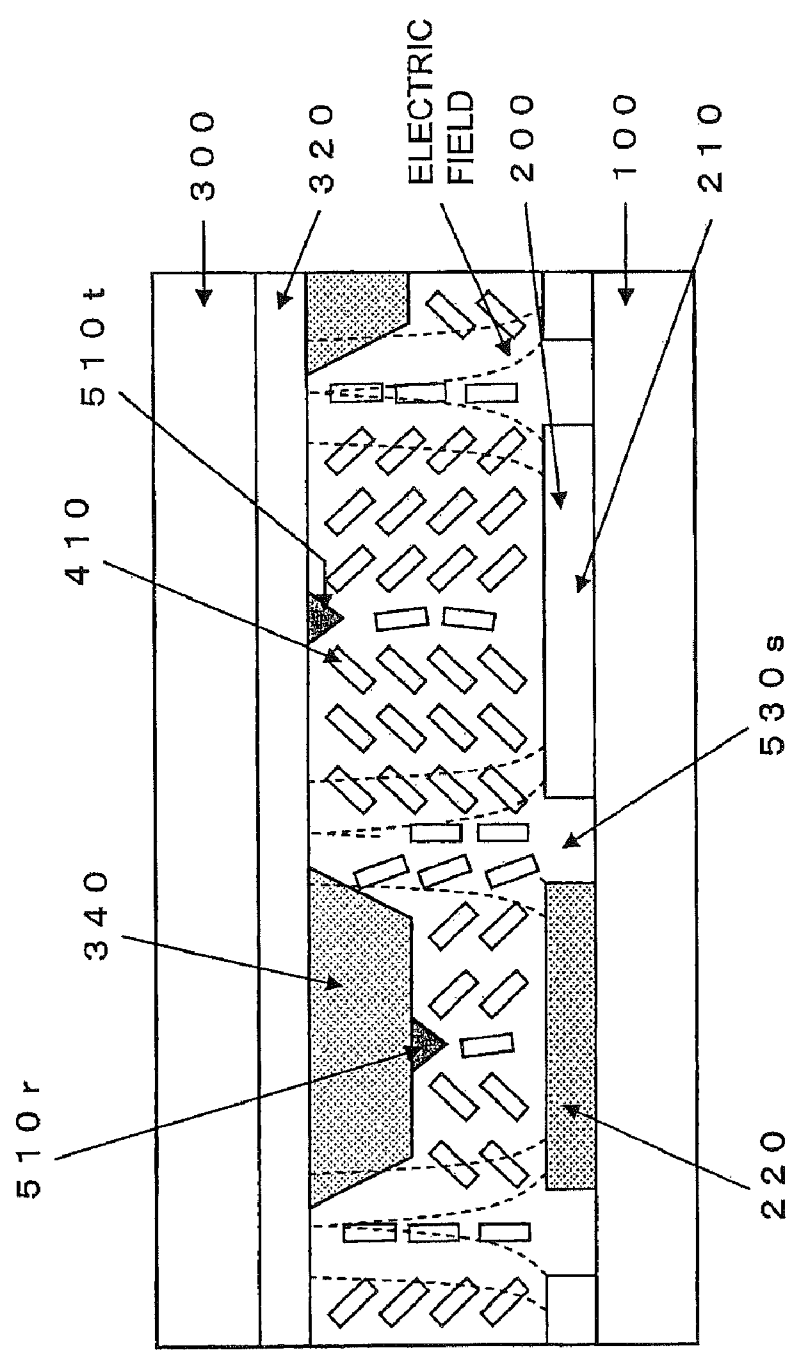
FIG. 8 is a diagram schematically showing a cross sectional structure of a transflective LCD along the C-C' line of FIG. 7.

Referring to FIGS. 4 and 8, the edge at the end of the gap adjusting section is provided outside a center in a line width direction of the linear alignment controller, and an inclined surface at the end of the gap adjusting section overlaps a formation region of the linear alignment controller at a location outward from the center such that the inclined surface does not overlap the center of the alignment controller.

Although not shown in FIG. 4, an entire surface of the second substrate 300 including the projection 510 and the gap adjusting section 340 is covered by a vertical alignment film 260 as shown in FIGS. 1 and 2. In addition, a vertical alignment film 260 is formed over the entire surface of the first substrate 100 including the pixel electrode 200 as shown in FIGS. 1 and 2. Therefore, when no voltage is applied between the pixel electrode 200 and the common electrode 320, a major axis direction 410 of the liquid crystal (liquid crystal director) is aligned perpendicular to the planar direction of the vertical alignment film 260. Therefore, on the projection 510 and the inclined surface of the gap adjusting section 340 at the side of the second substrate 300, the liquid crystal director 410 is aligned perpendicular to the inclined surface of the alignment film 260 which is formed on the surface facing the liquid crystal with the inclined surface transferred. Therefore, as shown in FIGS. 3 and 4, regions having alignment direction (alignment orientation, azimuth) of liquid crystal different from each other by 180 degrees are formed with the projection 510*r* as a boundary, the projection 510*r* being at the position to divide the reflective region 220 into upper and lower regions.

In the transmissive region 210 having a chevron shape (a shape of a pair of the shaft feather), as shown in FIGS. 3 and 5, a projection 510*t* having a triangular cross section is formed on the side of the second substrate 300, more specifically, on the common electrode 320 at a position (a position corresponding to a core of the chevron) dividing the pixel electrode 200 having a hexagonal shape elongated along the vertical scan direction into equal parts along the vertical scan direction into right and left regions (horizontal scan direction). Although not shown in FIG. 5 similar to FIG. 4, vertical alignment films 260 are formed as shown in FIGS. 1 and 2 on surfaces contacting the liquid crystal on the side of the second substrate 300 and on the side of the first substrate 100. In the transmissive region 210, the alignment direction (alignment orientation) of the liquid crystal director 410 is divided into directions which differ from each other by 180 degrees at the projection 510*t* formed on the second substrate as a boundary.

In addition, in the present embodiment, in addition to the projection and inclined surface as described above, an electrode absent section 530 is also used as the alignment controller 500. In the illustrated structure of FIGS. 3-5, a gap portion between a plurality of pixel electrodes 200 formed on the side of the first substrate 100 is used as an electrode absent section 530 for controlling the alignment. The alignment division by the electrode absent section 530 takes advantage of a slope of a weak electric field when a voltage starts to be applied between the pixel electrode 200 and the common electrode 320. Under the weak electric field, the electric field lines shown in FIGS. 4 and 5 by a dotted line are tilted in a tilted angle spreading from the end of the electrode absent section, that is, from the end of the electrode toward the center of the electrode absent section. Because a minor axis of the liquid crystal having a negative dielectric constant anisotropy is aligned along the tilted electric field line, the direction in which the liquid crystal molecules are tilted from the initial vertically aligned state as the applied voltage to the liquid crystal increases is defined by the tilted electric field.

The hexagonal pixel electrode 200 shown in FIG. 3 has the electrode absent section 530 at the ends of the pixel electrode 200. That is, at least six sides of electrode absent section 530 are present. Therefore, because of the actions of the projection 510 (510*r* and 510*t*), the inclined surface 520, and the electrode absent section 530 on the periphery of the pixel electrode 200, a total of four regions are formed having different alignment directions of the liquid crystal director 410 within one pixel region, at least two alignment regions in the reflective region 220 and two alignment regions in the transmissive region 210 within one pixel region, each having a different alignment direction from either of the two regions of the reflective region 220.

More accurately, the liquid crystal director 410 is controlled so that its planar component (alignment direction) is perpendicular to the extension direction of the projection 510 and the extension direction of the edge of the electrode (electrode absent section). Therefore, in any of the four alignment regions, the alignment direction of the liquid crystal is not completely identical throughout the region. For example, on the central position of the transmissive region 210 along the vertical scan direction in FIG. 3, the liquid crystal director 410 is aligned in a direction perpendicular to the projection 510*t* and the edge of the pixel electrode 200 extending along the vertical scan direction. However, at the boundary of the transmissive region 210, for example, with the reflective region 220, the inclined surface (projection) 520 by the gap adjusting section 340 and the projection 510*t* of the transmissive region 210 intersect each other at an angle of greater than 90 degrees. Therefore, the alignment direction of the liquid crystal around the intersection changes from a direction perpendicular to the extension direction of the projection 510 to a direction perpendicular to the extension direction of the inclined section 520 as the position becomes closer to the inclined section 520 by the gap adjusting section 340. However, as will be described later, in one alignment region, the extension direction of the alignment controller 500 is set to minimize a degree of change (or maximum angle) of the alignment direction of the liquid crystal based on the position so that generation of a boundary (disclination line) of regions having different alignment directions of liquid crystal at an uncertain position within one alignment region is prevented.

A relationship between the extension direction of the alignment controller 500 and the alignment direction of the liquid crystal in each position within one pixel region according to the present embodiment will now be described.

An angular difference between the alignment direction of the liquid crystal controlled by the projection 510*t* of the transmissive region 210 and the alignment direction of the liquid crystal controlled by the inclined section 520 of the gap adjusting section 340 intersecting the projection 510*t* is less than 90 degrees because the top and bottom of the liquid crystal molecule along the major axis direction do not have an optical characteristic difference. In the illustrated structure of FIG. 3, the intersecting angle between the projection 510 and the projection 520 by the gap adjusting section 340 is approximately 135 degrees whereas the difference in the alignment directions of the liquid crystal is 45 degrees. In this description, although the projection 510*t* and the gap adjusting section 340 are described to intersect each other, in some cases, the projection 510 and the gap adjusting section 340 may not physically intersect each other. Therefore, in this description, the term "intersect" refers to intersection of extended lines of two lines, and, when the two structures are provided on different substrates, intersection of projection lines of the extended lines to the plane of the same substrate.

The angle of intersection of the inclined section 520 by the gap adjusting section 340 and a side of the pixel electrode 200 of the transmissive region 210 (in reality, the angle of intersection of projection lines to the plane of the same substrate because the inclined surface 520 and the pixel electrode 200 are not formed on the same substrate) is approximately 45 degrees in the illustrated structure of FIG. 3. An angle between the alignment direction of the liquid crystal controlled by the inclined section 520 and the alignment direction of the liquid crystal controlled by the edge of the pixel electrode 200 is 90 degrees or smaller, and, in this configuration, is less than 45 degrees.

The intersection angle on the projection lines to the plane of the substrate of the projection 510*t* and the edge of the pixel electrode 200 near the lower end of the transmissive region 210 is 45 degrees in this structure and a difference of alignment direction of the liquid crystal near the intersection is less than 90 degrees and is 45 degrees or smaller in this structure because the top and bottom of the liquid crystal molecule do not have a characteristic difference, as described above.

The transmissive region 210 further has a region in which the sides of the pixel electrode 200 intersect each other. In the illustrated structure of FIG. 3, a side extending along the vertical scan direction and a side extending from a vertex intersecting the projection 510 toward the side extending along the vertical scan direction correspond to these sides, and the intersection angle of the sides is greater than 90 degrees and 135 degrees in FIG. 3. The difference of the alignment direction of liquid crystal at the intersection is less than 90 degrees and is 45 degrees because the top and bottom of the liquid crystal molecule do not have a characteristic difference.

Similarly, in the reflective region 220, the alignment controllers 500 are provided such that a difference in the alignment direction of the liquid crystal is less than 90 degrees in a region in which a projection line of an alignment controller 500 to the plane of the substrate (including the extended line) and a projection line of another alignment controller 500 to the plane of the substrate (including the extend line) intersect each other. That is, a projection 510*r* which divides the reflective region 220 into upper and lower regions having different alignment directions and the inclined section 520 by the gap adjusting section 340 which intersects at the end of the pixel electrode 200 intersect each other at an angle of less than 90 degrees and the angular difference of the alignment directions of the liquid crystal in the intersection region is controlled to be 45 degrees or less which is less than 90 degrees.

An intersection angle between the projection 510*r* and the edge of the pixel electrode 200 in the reflective region 220 (intersection angle of projection lines to the plane of the substrate) is also less than 90 degrees, and the angular difference between the alignment directions of the liquid crystal in the intersection is also controlled to be 45 degrees or less which is less than 90 degrees.

As described, the alignment controllers 500 (projection 510, inclined section 520, and electrode absent section 530 (in the illustrated structure of FIG. 3, shape of the pixel electrode 200)) are determined such that a difference between alignment directions of the liquid crystal controlled by the alignment controllers 500 is less than 90 degrees when the projection lines of the alignment controllers 500 to the plane of the substrate intersect each other. In this manner, generation of a disclination line in an uncertain position within a region divided by the alignment controller 500 is reliably prevented.

At the position in the reflective region 220 in which the sides of the pixel electrode 200 intersect each other (in FIG. 3, near a vertex at the uppermost section of the pixel electrode 200 along the vertical scan direction) and the intersection between the inclined sections 520 by the gap adjusting sections 340 (around the bend of the "V" shape), the angles of intersection are both 90 degrees in the illustrated structure of FIG. 3. From the above-described view point, these intersection angles are preferably less than 90 degrees or greater than 90 degrees, but because the area of the reflective region 220 having a rhombus shape is small compared to the transmissive region, generation of a disclination line at an uncertain position is prevented.

The liquid crystal in the reflective region 220 is more strongly affected by the alignment control by the projection 510*r*, inclined section 520, and the side of the pixel electrode 200. Therefore, on a tilted line of the rhombus-shaped reflective region 220 connecting an intersection of the sides of the electrode 200 in the reflective region 220 and the intersection between inclined sections 520 by the gap adjusting sections 340, no physical alignment controller 500 is present. However, the liquid crystal is controlled equally by the nearby alignment controllers 500, and, the planar component of the liquid crystal director 410 at this position becomes a direction along the vertical scan direction as shown in FIG. 3, because of influences of both continuation with the liquid crystal controlled along a direction perpendicular to the extension direction of the projection 510*r*. As the position becomes closer from this position to the end of the pixel electrode along the horizontal scan direction, the liquid crystal is affected by the side (530) of the pixel electrode 200, the extension direction of the inclined surface 520 of the gap adjusting section 340, and the projection 510*r* and is controlled to face a direction which is slightly shifted from the direction perpendicular to these extension directions (by less than 90 degrees, and less than 45 degrees in the illustrated structure of FIG. 3). Therefore, in the reflective region 220 also, generation of a disclination line at an uncertain position is prevented.

Next, a structure and a manufacturing method of a pixel electrode 200 and a thin film transistor TFT connected to the pixel electrode will be described referring to FIG. 6. In the present embodiment, as described above, an active matrix LCD is employed in which each pixel comprises a thin film transistor. As shown in FIG. 6, the thin film transistor TFT is formed between the pixel electrode 200 formed on the side of the first substrate 100 and the substrate 100. In order to place the transmissive region 210 and the reflective region 220 within a pixel region as effectively as possible, in particular, in order to not reduce the aperture ratio in the transmissive region 210, the TFT which is typically formed in a light shielding region even in a transmissive LCD is placed in the reflective region 220 so that the aperture ratio is not affected even when the thin film transistor TFT is formed.

In the present embodiment, a top gate TFT is employed as the TFT and polycrystalline silicon (p-Si) obtained by polycrystallizing amorphous silicon (a-Si) by laser annealing is used as an active layer 20. The TFT is not limited to a top gate TFT with p-Si, and a bottom gate TFT or a TFT in which a-Si is used in the active layer may alternatively be used. Impurities to be doped into the source and drain regions 20_s_ and 20_d_ of the active layer 20 of the TFT may be of an n-conductive type or a p-conductive type. In the present embodiment, an n-conductive impurity such as phosphorus is doped, and, thus, an n-ch TFT is used.

The active layer 20 of the TFT is covered by an gate insulating film 30 and a gate electrode 32 which is made of a refractory metal such as Cr and Mo and which also functions as a gate line is formed on the gate insulating film 30. After the gate electrode 32 is formed, the above-described impurity is doped into the active layer 20 using the gate electrode 32 as a mask to form the source region 20_s_, drain region 20_d_, and a channel region 20_c_ which is not doped with the impurity. Then, an interlayer insulating film 34 is formed covering the entire surface of the TFT 110, contact holes are formed through the interlayer insulating film 34, and a layer of an electrode material is formed so that a source electrode 40 is connected to the source region 20_s_ of the p-Si active layer 20 and a drain electrode 36 is connected to the drain region 20_d_ of the p-Si active layer 20 through the contact holes. In the present embodiment, the drain electrode 36 also functions as a data line for supplying a data signal corresponding to the display content to the TFT 110. The source electrode 40, on the other hand, is connected to the first electrode 200 which is the pixel electrode as will be described later. As the drain electrode 36 and the source electrode 40, a highly conductive material such as Al is used.

After the source electrode 40 and the drain electrode 36 are formed, a planarizing insulating film 38 made of a resin material such as an acrylic resin is formed covering the entire surface of the substrate. Then, a contract hole is formed through the planarizing insulating layer 38 at a formation region of the source electrode 40, a connection metal layer 42 is formed in the contact hole, and the source electrode 40 and the metal layer 42 are connected. When Al or the like is used as the source electrode 40, it is possible to achieve superior ohmic contact between the source electrode 40 and the metal layer 42 using a metal material such as Mo as the metal layer 42. The source electrode 40 may be omitted, and, in this case, the metal layer 42 directly contacts the silicon active layer 20 of the TFT 110. The metal such as Mo can establish ohmic contact with such a semiconductor material.

After the connection metal layer is layered and patterned, an Al—Nd alloy for a reflective layer or a reflective material layer such as Al having a superior reflective characteristic is layered on the entire surface of the substrate through evaporation or sputtering. The layered reflective material layer is etched and removed in a region near the source region of the TFT (formation region of the metal layer 42) so that the reflective material layer does not block the contact between the metal layer 42 and the TFT and the pixel electrode 200 to be formed later than the reflective material layer, and, at the same time, etched and removed so that the reflective material layer is not present in the transmissive region and a reflective layer 44 having an outer shape of rhombus is formed in the reflective region 220 of each pixel as shown in FIG. 3. In the present embodiment, in order to prevent generation of a leak current by irradiation of light to the TFT (in particular, the channel region 20_c_) and to widen the region which can reflect (that is, the display region) as much as possible, the reflective layer 44 is intentionally formed also above the channel region of the TFT 110 as shown in FIG. 1.

In the patterning of the reflective layer 44 as described, the metal layer 42 made of Mo or the like has a sufficient thickness (for example, 0.2 μm) and has a sufficient endurance to the etching solution. Therefore, even after the reflective layer 44 on the metal layer 42 is removed through etching, the metal layer 42 is not completely removed and remains in the contact hole. Because the source electrode 40 or the like is formed by a material similar to the reflective layer 44 (Al or the like), if the metal layer 42 is not present, the source electrode 40 would be corroded by the etching solution of the reflective layer 44, resulting in disconnection or the like. By providing a metal layer 42 as in the present embodiment, it is possible to endure the patterning process of the reflective layer 44 and to maintain superior electrical connection between the metal layer 42 and the source electrode 40.

After the reflective layer 44 is patterned, a transparent conductive layer is layered covering the entire surface of the substrate including the reflective layer 44 through sputtering. In this process, the surface of the reflective layer 44 made of Al or the like as described is covered by a natural oxide film which is insulating, but the surface of the refractory metal such as Mo is not oxidized even when the refractory metal is exposed to the sputtering atmosphere. Therefore, the metal layer 42 exposed in the contact region can form an ohmic contact with the transparent conductive layer for the pixel electrode layered on the metal layer 42. After the transparent conductive layer is formed, the transparent conductive layer is patterned into a shape independent for each pixel, common to the reflective region and transmissive region within a pixel region, and into an elongated hexagonal shape, for example, as shown in FIG. 3, to obtain a pixel electrode 200. After the pixel electrode 200 is formed through patterning, an alignment film 260 made of polyimide or the like is formed covering the entire surface of the substrate and the first substrate side is completed. Then, as shown in FIGS. 1 and 2, the second substrate 300 on which the red, green, and blue color filter layers, common electrode 320, gap adjusting section 340, projection 510 (510_r_ and 510_t_), and alignment film 260 covering these structures are formed is adhered with the first substrate 100 around the periphery of the substrates with a predetermined space therebetween, and the liquid crystal is sealed between the substrates to obtain the LCD.

The common electrode 320 formed on the side of the second substrate 300 in the illustrated structure of FIGS. 1 and 2 is formed above the gap adjusting layer 340 and a projection 510 is formed on the common electrode 320 at a desired position. Alternatively, as shown in FIG. 4, the common electrode 320 may be formed below the gap adjusting section 340 (more specifically, between the color filter formed on the second substrate 300 and the gap adjusting section 340). When the thickness of the gap adjusting section 340 is very large, if the common electrode 320 is formed below the gap adjusting section 340 as shown in FIG. 4, the effective voltage applied to the liquid crystal layer 410 is reduced. However, when a sufficiently large voltage is to be applied between the common electrode 320 and the pixel electrode 200 or the thickness of the gap adjusting section 340 is not too large, it is possible to employ the configuration as shown in FIG. 4.

Figure 7:
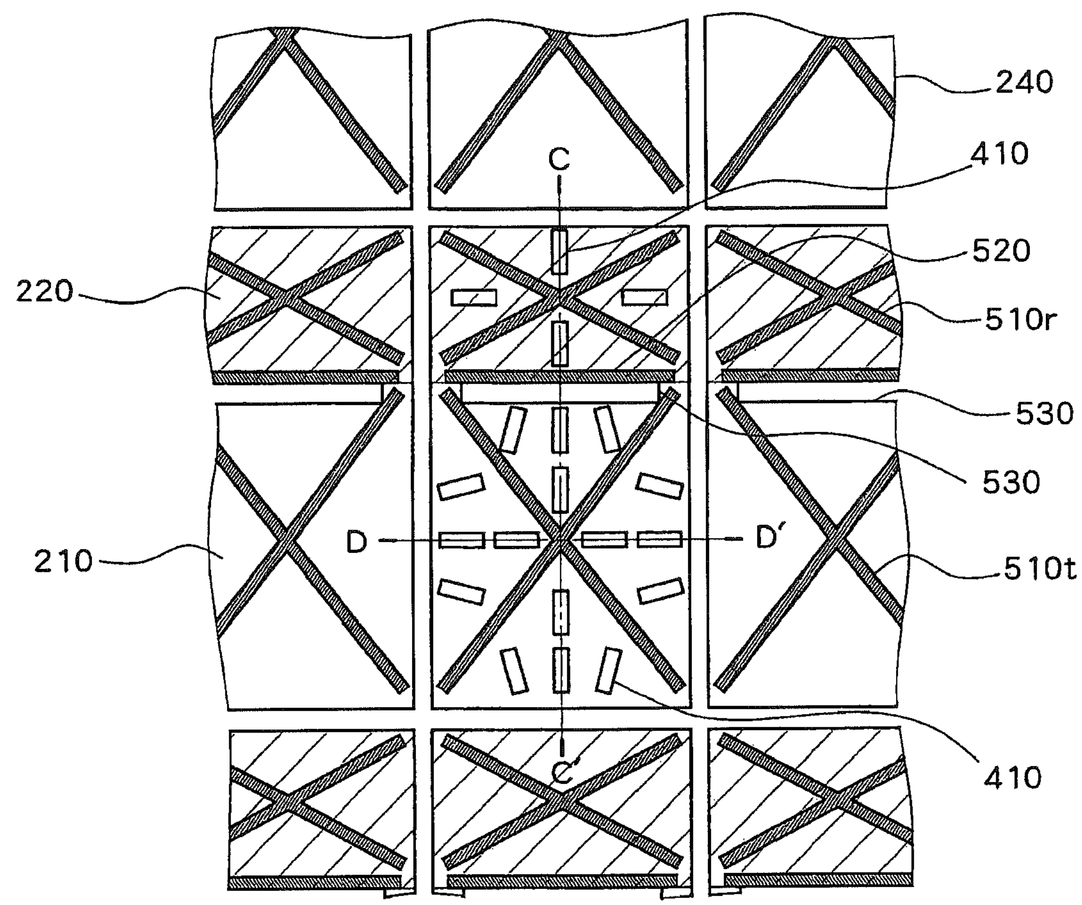
FIG. 7 is a diagram schematically showing a planar structure of a transflective LCD which differs from the structure of FIG. 3 according to a first preferred embodiment of the present invention.

Next, an alternative configuration of a structure of each pixel in the transflective LCD according to the present embodiment will be described. FIG. 7 schematically shows a planar structure of the transflective LCD according to the alternative configuration and FIG. 8 is a diagram schematically showing a cross sectional structure along the C-C' line of FIG. 7. A schematic cross sectional structure along the D-D' line of FIG. 7 is identical to the schematic cross sectional structure shown in FIG. 5.

A difference from the structure shown in FIG. 3 is that the shape of the pixel electrode 240 in FIG. 7 is rectangular and approximate X-shaped projections 510_t_ and 510_r_ are formed as the alignment controllers 500 in the transmissive region

210 and the reflective 220, both of which are quadrangular regions, at positions corresponding to the diagonal lines of the quadrangle. With such alignment controllers 500, four regions having different alignment directions of liquid crystal are formed in the transmissive region 210 and the reflective region 220 with the projections 510*t* and 510*r* being the boundaries, and, as a consequence, the viewing angle is further widened.

At the boundary of the transmissive region 210 in a pixel region, as described above, an alignment controller 500 realized by the inclined section 520 of the gap adjusting section 340 is formed on the side of the second substrate 300 and an electrode absent section 530 (slit; window 530*s*) extending along the horizontal scan direction along with the inclined section 520 is provided in the pixel electrode 200. Therefore, in the boundary region between the transmissive region 210 and the reflective region 220, the initial alignment of the liquid crystal is controlled by the inclined surface (inclined section 520) of the gap adjusting section 340 at the second substrate side to a direction perpendicular to the inclined surface and is controlled in different directions from each other with the boundary at the electrode absent section 530*s* on the first substrate side due to the tilt of the weak electric field as shown in FIG. 8 in the electrode absent section 530*s*. Thus, the alignment division of the liquid crystal around the boundary between the transmissive region 210 and the reflective region 220 is more reliably realized.

As described, although the structure of FIG. 7 differs from FIG. 3 in the individual pattern of the alignment controllers 500 including the edge of the pixel electrode 200, the projection 510, and the electrode absent section 530*s* and in the number of alignment divisions, with the configuration of FIG. 7 also, an angular difference between the alignment direction of the liquid crystal controlled by a certain alignment controller 500 and an alignment direction of the liquid crystal controlled by another alignment controller 500 having a projection line which intersects the projection line of the alignment controller 500 onto the plane of the substrate is less than 90 degrees at any intersection. Therefore, it is possible to reliably prevent generation of a disclination line at an uncertain position within any of the divided alignment regions. In addition, by employing a pattern of the alignment controller 500 as shown in FIG. 3 or FIG. 7, it is possible to achieve a maximum number of alignment division and reliable alignment division with a minimum amount of alignment controllers 500 formed. In the vertical alignment liquid crystal employed in the present embodiment, when no voltage is applied, that is, in a vertical alignment state, black is displayed. Therefore, in addition to the gap between pixel electrodes 200 not contributing to the display, even when a sufficient voltage is applied between the common electrode 320 and the pixel electrode 200, the alignment state of the liquid crystal at positions directly above the other alignment controllers 500 (projection 510, inclined section 520, and slit 530*s*) does not significantly change, and the liquid crystal above at these positions does not contribute to the display. Therefore, placement of redundant alignment controllers 500 would reduce the aperture ratio of the LCD. However, by employing layouts as shown in FIGS. 3 and 7, it is possible to widen the viewing angle and improve the display quality while inhibiting the reduction in the aperture ratio to a minimum degree.

Figure 9:
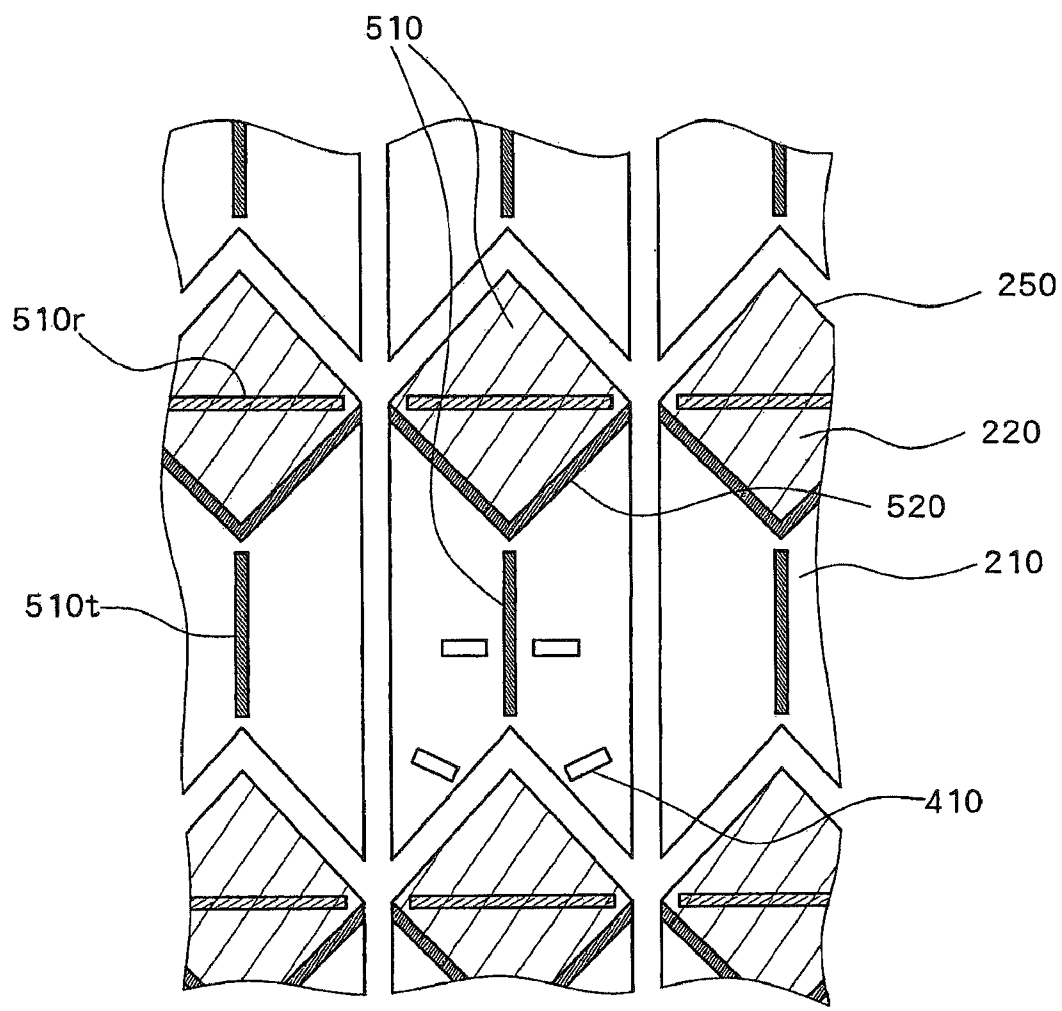
FIG. 9 is a diagram schematically showing a planar structure of a transflective LCD according to an alternative configuration of the preferred embodiment of FIG. 3.
Figure 10:
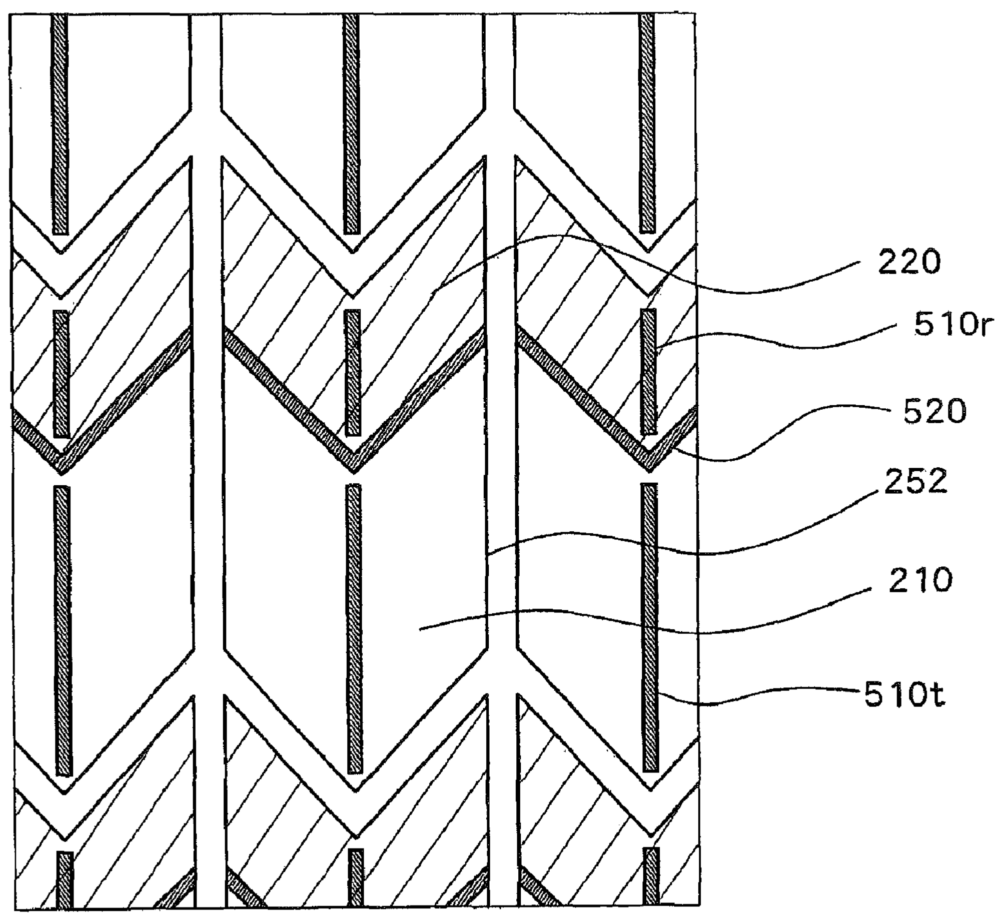
FIG. 10 is a diagram schematically showing a planar structure of a transflective LCD according to another alternative configuration of the preferred embodiment of FIG. 3.

FIGS. 9 and 10 show other alternative configurations of the configuration of FIG. 3.

In FIG. 9, the pixel electrode 250 has an overall shape of a chevron. The shape and the structure of the reflective region 220 is identical to those in FIG. 3. However, the pattern of the remaining transmissive region 210 differs from that in FIG. 3 in that the shape is a lateral enveloping shape, a shape of an laterally placed hourglass, or a shape in which M and W are connected to each other along the vertical direction. The projection line of the projection 510*t* onto the plane intersects, at an angle of greater than 90 degrees (in the illustrated structure, 135 degrees), two sides of the pixel electrode 250 in the transmissive region 210 having the projection lines to the plane intersecting each other. Because the top and the bottom of the liquid crystal molecules do not have an optical characteristic difference along the major axis direction as described above, the angle difference between alignment directions of the liquid crystal in the intersection region is again less than 90 degrees. In addition, an intersection angle between two lower sides of the pixel electrode 250 extending from the intersection position with the projection 510*t* toward the lower end of two sides of the pixel electrode 250 extending along the vertical scan direction and the side of the pixel electrode 250 along the vertical scan direction is less than 90 degrees, and the maximum difference in the alignment directions of the liquid crystal in this region is also less than 90 degrees (in the illustrated structure of FIG. 9, less than 45 degrees). Therefore, in two alignment regions within the transmissive region 210 also, generation of a disclination line at an uncertain position is prevented.

In FIG. 10, the pixel electrode 252 has a chevron shape. The shape (chevron shape) and structure of the transmissive region 210 are identical to those in FIG. 3. The shape of the remaining reflective region 220 of the pixel electrode 252 having a chevron shape and the formation position of the projection 510*r* which divides the alignment of the liquid crystal within the reflective region 220 differ from those in FIG. 3. More specifically, in the illustrated structure of FIG. 10, the reflective region 220 also has a chevron shape with a short height and, at the boundary between the reflective region 220 and the transmissive region 210, the alignment is divided by a V-shaped inclined section 520 of the gap adjusting section 340. A projection 510*r* is formed on the side of the second substrate (above the gap adjusting section) on a line along the vertical scan direction and connecting the vertex of the V-shape of the inclined section 520 and a vertex of a similar V-shape of the pixel electrode 252 in the reflective region 220. Two alignment regions are formed in the reflective region 220 on left and right of the projection 510*r* along the horizontal scan direction with the projection 510*r* being the boundary. With such a structure also, an angular difference between an alignment direction of the liquid crystal controlled by an alignment controller 500 and an alignment direction of the liquid crystal controlled by another alignment controller 500 having a projection line intersecting a projection line of the alignment controller 500 onto the plane of the substrate satisfies the condition of being less than 90 degrees, and thus, a superior alignment division is realized.

Next, a drive voltage, transmittance, and wavelength dependencies of the drive voltage and transmittance in the vertical alignment transflective LCD according to the present embodiment will be described.

Figure 11:
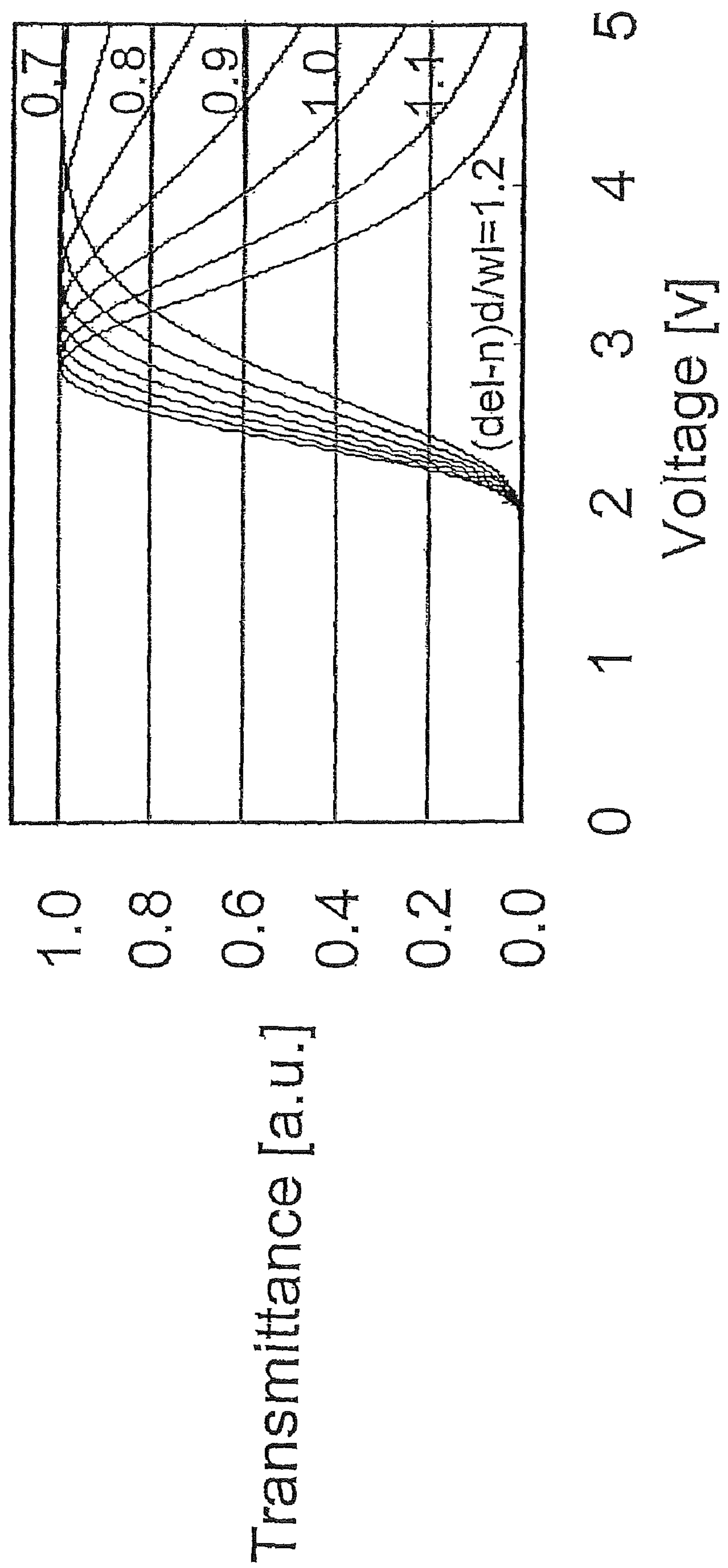
FIG. 11 is a diagram showing a relationship between the applied voltage and transmittance characteristic for various cell structures in a vertical alignment transflective LCD according to a first preferred embodiment of the present invention.

FIG. 11 shows a relationship between an applied voltage (V) and transmittance (arbitrary unit) in liquid crystal, and shows an optical characteristic of the vertical alignment liquid crystal cell, that is, relationship between the applied voltage and the transmittance when the cell structure is changed, represented by an expression (del−n)d/wl (expression (i)).

In FIG. 11, wl is set to 550 nm (green). In the expression (i), the term (del−n) represents a birefringence (that is, refractive index anisotropy) ($\Delta n$) of the liquid crystal layer, d represents a thickness (cell gap) of the liquid crystal layer, and wl represents a wavelength of the incident light. In a small LCD or the like which is equipped in a portable device such as a portable phone, a further reduction in the power consumption and further reduction in the drive voltage are desired. As can be understood from FIG. 11, in a cell having a value of, for example, 1.0 for the above-described expression (i), the applied voltage may be approximately 3 V for achieving a maximum transmittance and that when the value of the expression (i) is increased to 1.1 and 1.2, for example, the applied voltage can be reduced to less than 3 V. By finely adjusting the value of d, it is possible to drive at a sufficiently low voltage even when a same liquid crystal material and a same light source is used. As shown in FIGS. 1 and 2, the value of d can be adjusted with a thickness of the gap adjusting section 340, color filter 330, and planarizing insulating layer 38.

Figure 12:
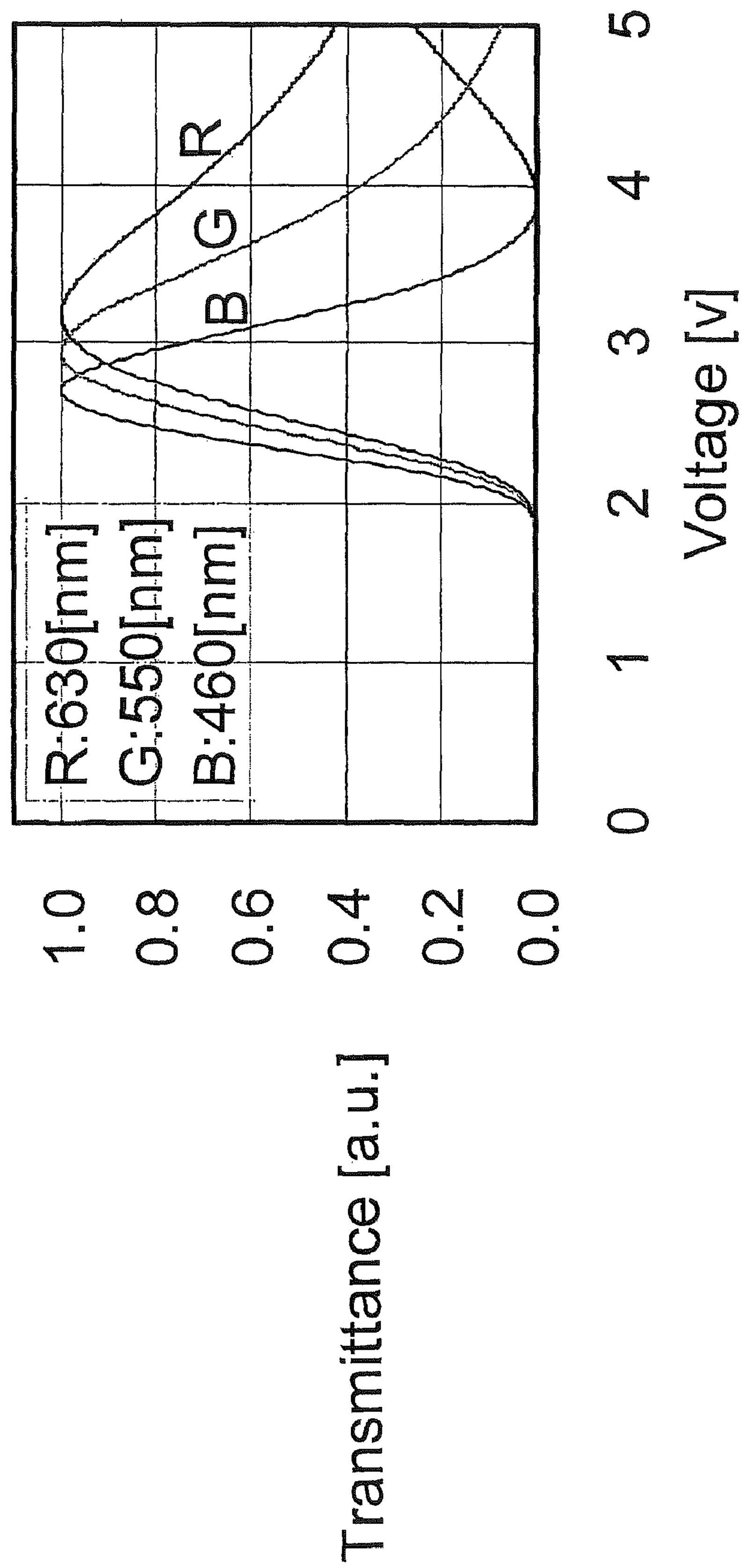
FIG. 12 is a diagram showing a wavelength dependency of a relationship between a transmittance characteristic and the applied voltage in a vertical alignment transflective LCD according to a first preferred embodiment of the present invention.
Figure 13:
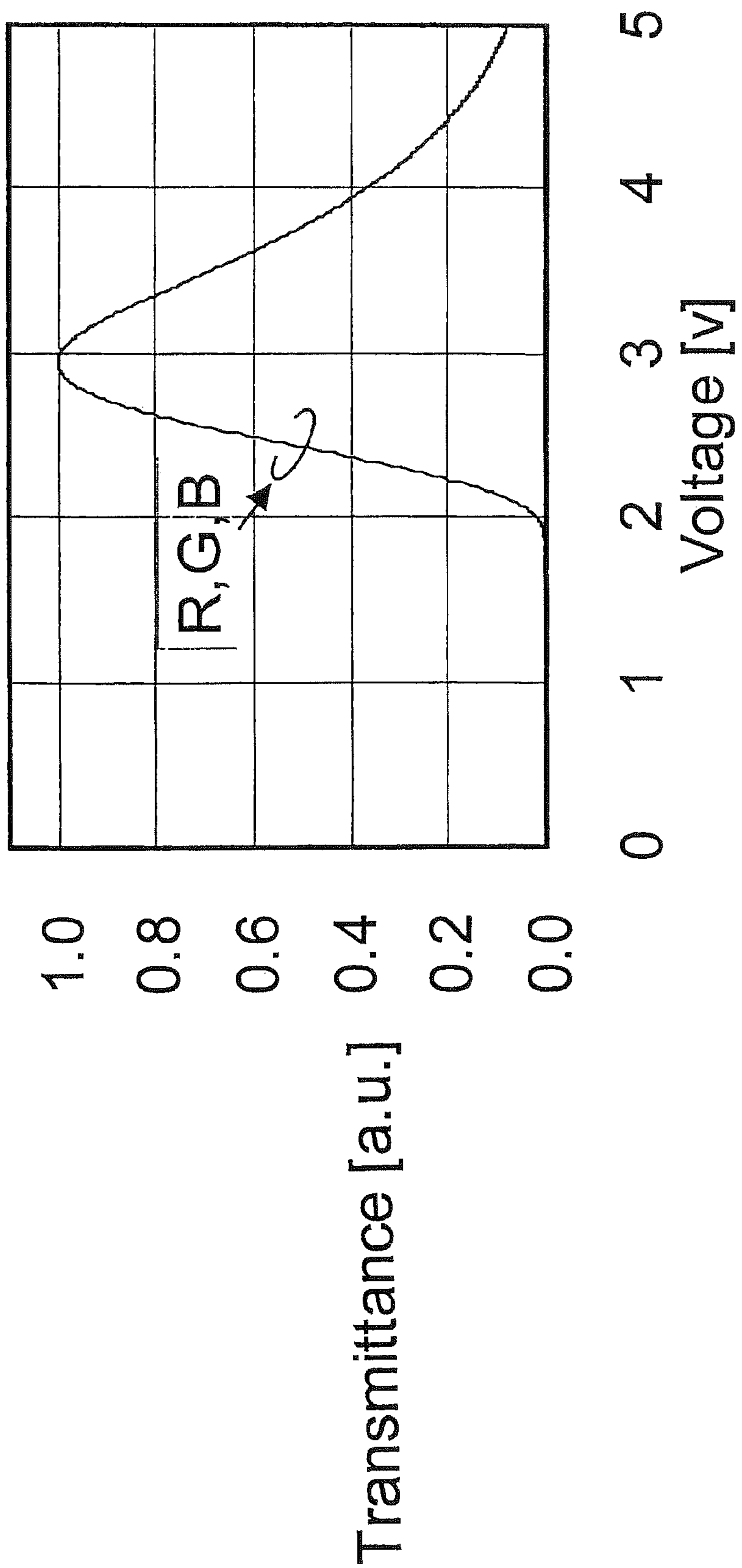
FIG. 13 is a diagram showing a wavelength dependency of a relationship between a transmittance characteristic and an applied voltage when the cell gap is adjusted for red, green, and blue in a vertical alignment transflective LCD according to a first preferred embodiment of the present invention.

As can be understood by the term of "wl" in expression (i), in the LCD of the present embodiment, the transmittance characteristic has a wavelength dependency. As shown in FIG. 12, when the thickness (cell gap) d of the liquid crystal layer is set to a constant for all of pixels for red, green, and blue, the transmittance characteristic with respect to the applied voltage differs for light of red (630 nm), green (550 nm), and blue (460 nm). FIG. 13, on the other hand, shows a relationship between the applied voltage and transmittance in an LCD in which the value of the cell gap d is adjusted by changing the thickness for each of red, green, and blue by changing, for example, the thickness of the color filters 330*r*, 330*g*, and 330*b* (alternatively, the cell gap may be adjusted by adjusting the thickness of the gap adjusting section 340). As can be understood from FIG. 13, by setting the cell gap d to a desired value for each of red, green, and blue, it is possible to set the transmittance characteristic with respect to the applied voltage to the same characteristic in each pixel corresponding to light of red, green, and blue. Therefore, it is clear that, by employing such a structure, it is possible to drive the LCD by an applied voltage of less than 3 V as shown in FIG. 11 and drive red, green, and blue pixels by display signals having the same amplitude.

Figure 14:
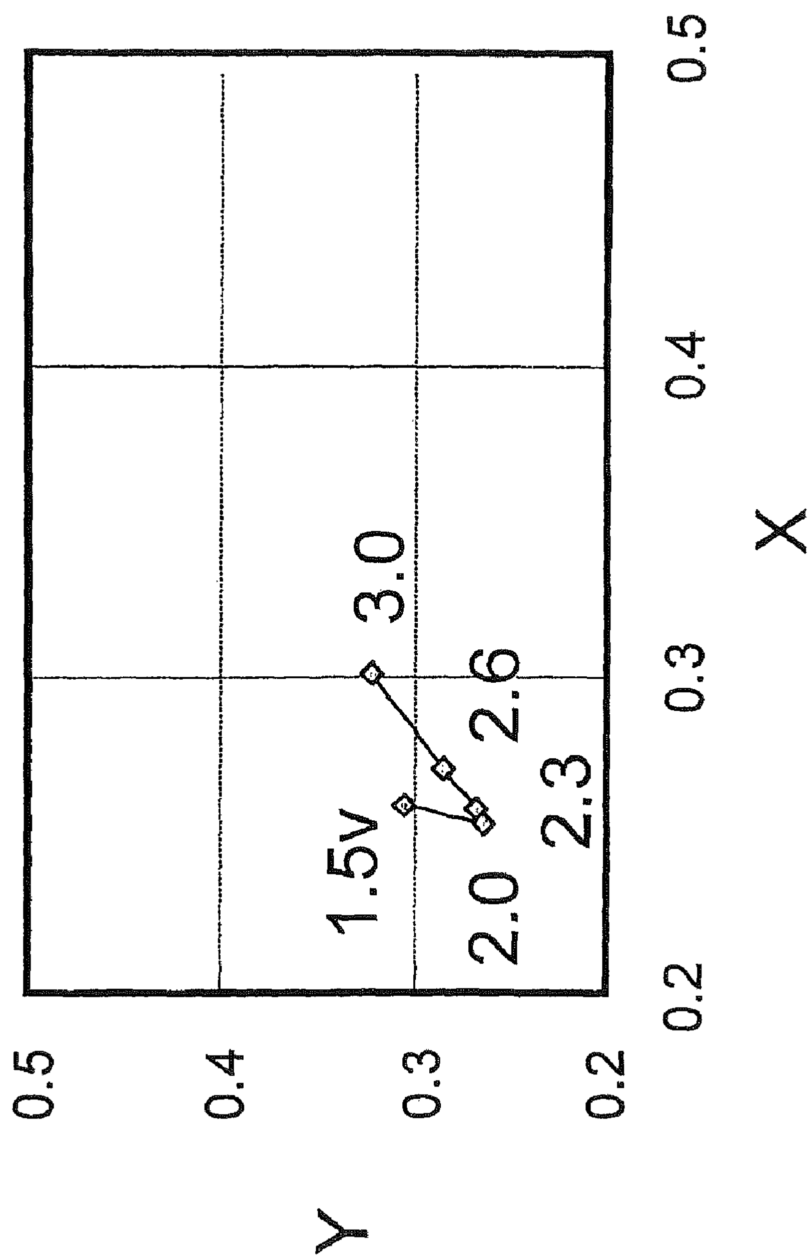
FIG. 14 is a diagram showing a chromaticity coordinate showing a dependency of chromaticity on an applied voltage in a vertical alignment transflective LCD according to a first preferred embodiment of the present invention.
Figure 15:
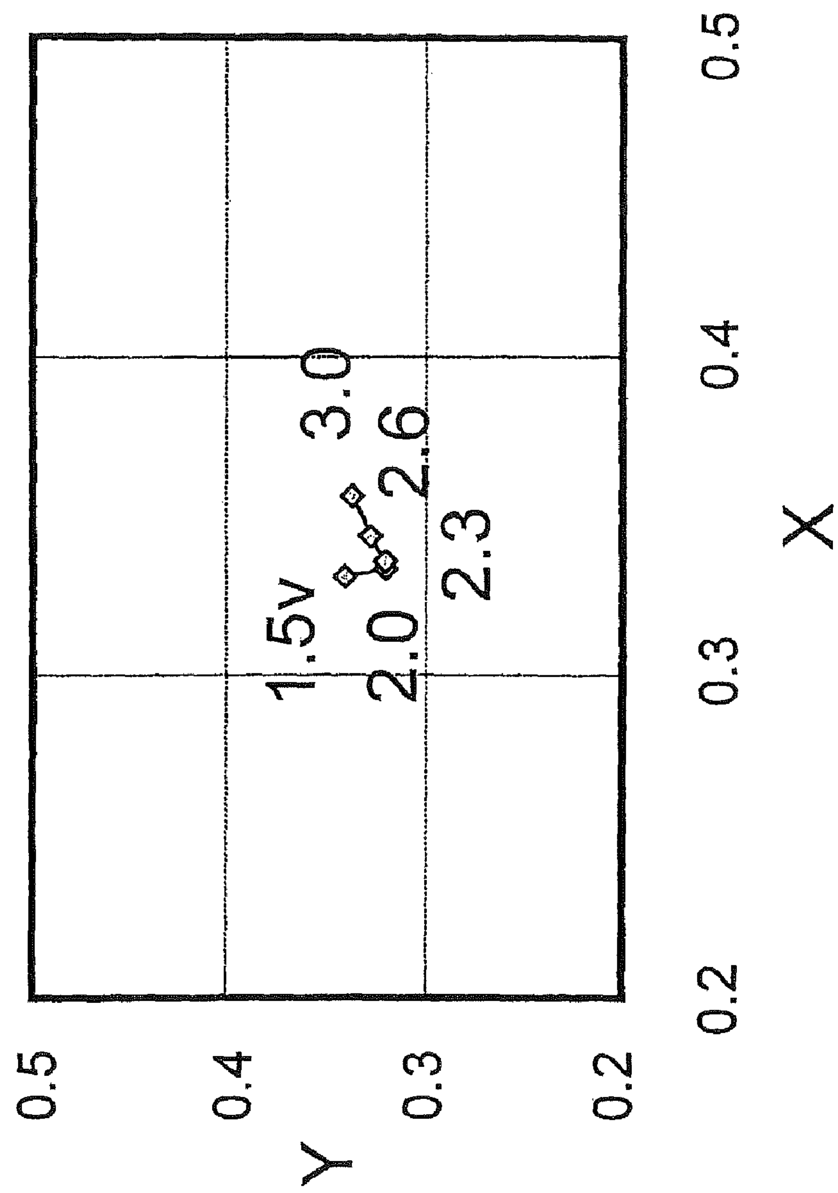
FIG. 15 is a diagram showing a chromaticity coordinate showing a dependency of a chromaticity on an applied voltage when the cell gap is adjusted for red, green, and blue in a vertical alignment transflective LCD according to a first preferred embodiment of the present invention.

FIGS. 14 and 15 show an applied voltage dependency of chromaticity (X-Y coordinates of CIE). FIG. 14 shows a change in the chromaticity when the voltage to be applied to the liquid crystal is changed from 1.5 V to 2.0 V, 2.3 V, 2.6 V, and 3.0 V in an LCD with a same cell gap in red, green, and blue as shown in FIG. 12. FIG. 15 shows a change in the chromaticity when the voltage to be applied is changed from 1.5 V to 2.0 V, 2.3 V, 2.6 V, and 3.0 V in an LCD having the cell gap adjusted for red, green, and blue so that there is no color dependency of the transmittance change with respect to the applied voltage. As can be understood from a comparison of FIGS. 14 and 15, by adjusting the cell gap in red, green, and blue, it is possible to improve the applied voltage dependency of the chromaticity, that is, the shift in chromaticity when the applied voltage is changed, and thus, to realize an LCD having a small color shift even when the LCD is driven by a voltage in various voltage ranges.

Second Preferred Embodiment

A second preferred embodiment of the present invention will now be described which is a configuration for improving a display quality in color display. In the below description, color display on a vertical alignment liquid crystal display device is exemplified.

A vertical alignment liquid crystal display device has a wide viewing angle characteristic and a high contrast characteristic, and has an advantage that no rubbing process of the alignment film is necessary.

In the vertical alignment liquid crystal display device, because the liquid crystal has a negative dielectric constant anisotropy, the liquid crystal molecules forming the liquid crystal has a characteristic that the liquid crystal tends to be directed in a direction perpendicular to the direction of the electric field. In such a liquid crystal display device, a vertical alignment film is employed as the alignment film for controlling the initial alignment of the liquid crystal and an organic material or the like such as, for example, polyimide and polyamide is used as the material of the vertical alignment film. In a vertical alignment liquid crystal display device, the liquid crystal molecules are controlled, by the vertical alignment film, to be directed along a direction of normal of the substrate on which the vertical alignment film is formed when no electric field is applied to the liquid crystal. When a voltage is applied between a pixel electrode and a common electrode to generate an electric field along the direction of normal of the substrate, the liquid crystal molecules in a region sandwiched by the electric fields is tilted to a direction perpendicular to the electric field.

With this process, the phase of the incident light transmitting through the liquid crystal changes. The phase change of the incident light transmitting through the liquid crystal can be represented as $\Delta nd/\lambda$ when a distance (gap) between the substrates sandwiching the liquid crystal is d, the dispersion of index of refraction is $\Delta n$, and the wavelength of light is $\lambda$. By allowing the light transmitted through the liquid crystal to transmit through a polarizer plate provided on the substrate, the transmittance of the incident light changes and a desired liquid crystal display is achieved. In this case, for example, the polarizer plate is set so that a black display is achieved when no voltage is applied and the transmittance of incident light is maximized at a certain constant voltage (white voltage Vwhite) when a voltage is applied.

Recently, as vertical alignment liquid crystal display devices, full-color vertical alignment liquid crystal display devices having pixels of three primary colors of red, green, and blue are developed.

Figure 17A:
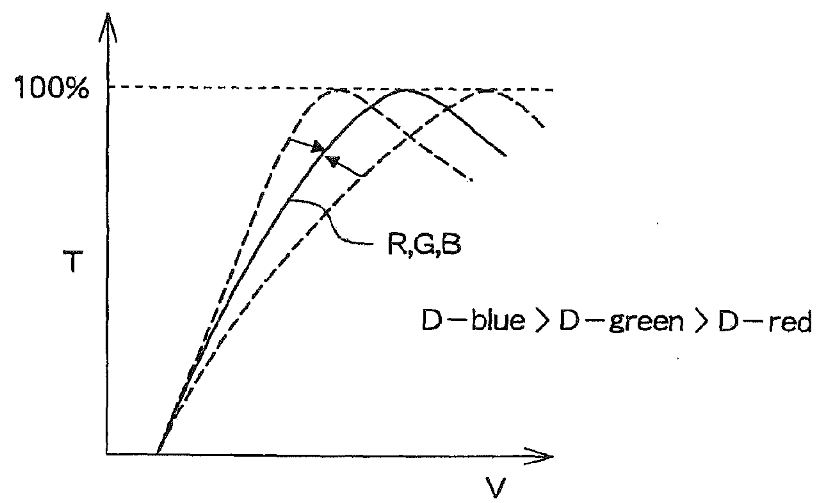
FIGS. 17A, 17B, and 17C are diagrams showing V-T characteristics for various cell gaps for pixels for red, green, and blue.
Figure 17B:
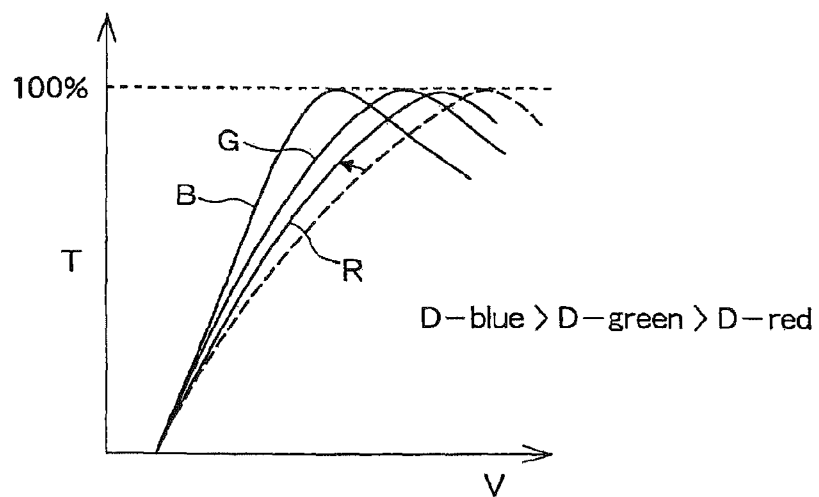
Figure 17C:
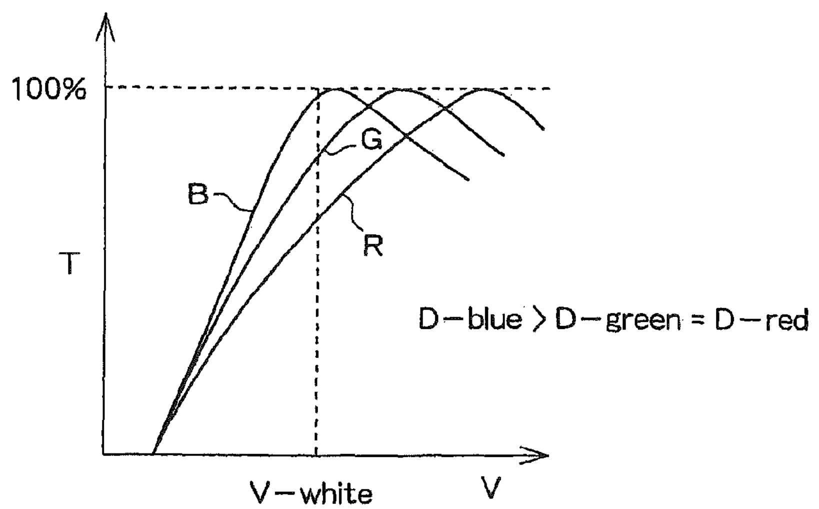

In a full-color vertical alignment liquid crystal display device, however, the wavelength $\lambda$ of the light transmitted through the color filters of different colors for pixels of the three primary colors of red, green, and blue differ among pixels, and, thus, the transmittance is not maximized with a constant voltage. In other words, as shown in FIG. 17C, the V-T characteristic (characteristic curve of applied voltage to the liquid crystal versus the transmittance) differs among the pixels for red, green, and blue. The transmittance T in the V-T characteristic increases as the applied voltage V to the liquid crystal increases and decreases after reaching a maximum. Normally, the white voltage Vwhite is set as the applied voltage V to the liquid crystal based on B (blue) in which the transmittance T reaches a maximum value at the lowest voltage among red, green, and blue.

When the white voltage Vwhite is applied, in the G (green) and R (red) pixels, the transmittance does not reach 100%, resulting in a problem in that color of white is viewed as a bluish color. Although it is possible to improve the problem of coloring by increasing the applied voltage to the liquid crystal (drive voltage) of the red pixel, with such a configuration, a new problem arises in that the power consumption of the liquid crystal display device increases.

Figure 16:
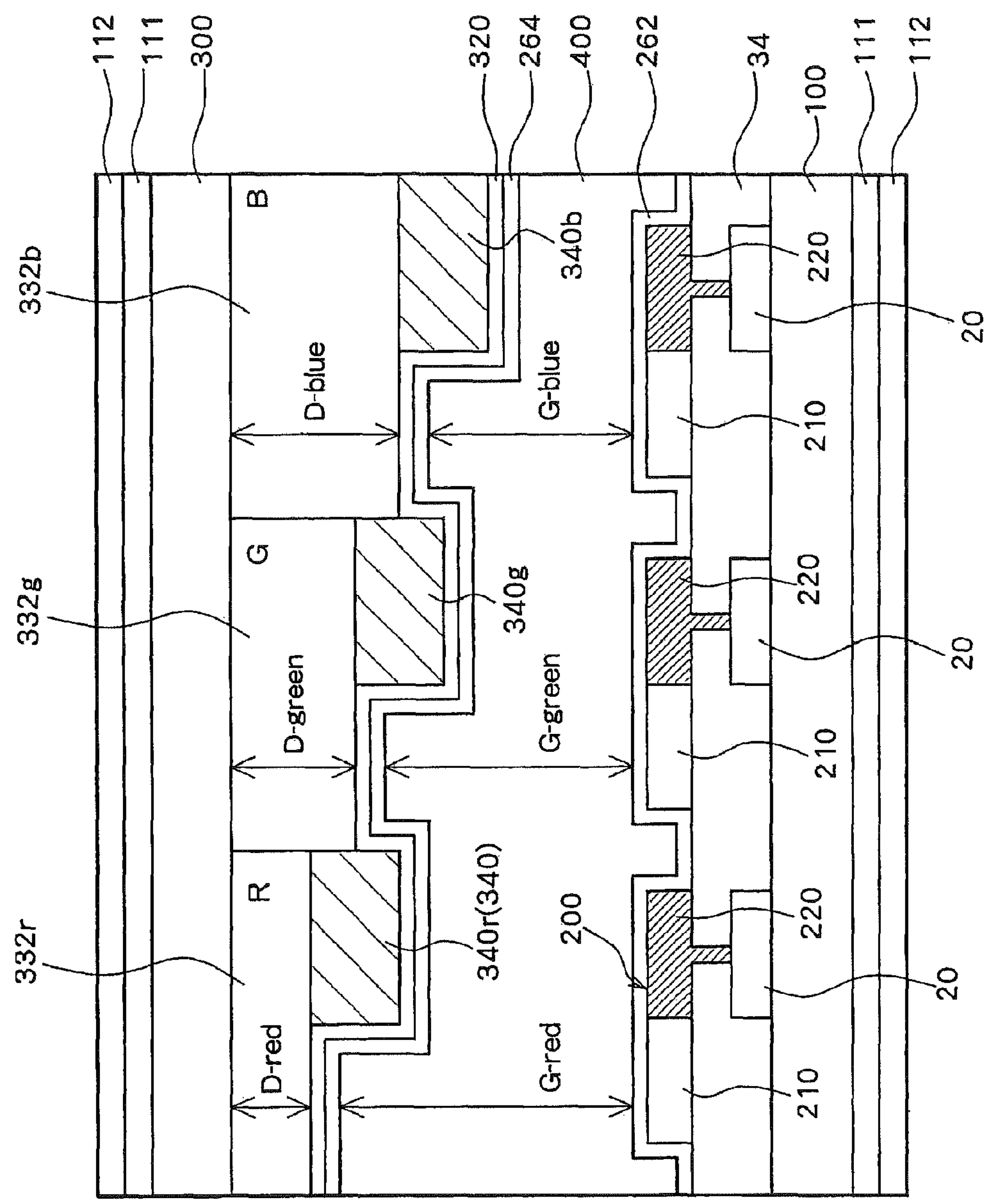
FIG. 16 is a cross sectional diagram of a vertical alignment liquid crystal display device according to a second preferred embodiment of the present invention.

FIG. 16 is a cross sectional diagram of a vertical alignment liquid crystal display device according to a second preferred embodiment of the present invention. The components identical to those in the first preferred embodiment (in particular, FIG. 1) are basically assigned the same reference numerals and will not be described again. Although the second preferred embodiment is described exemplifying a transflective LCD in which a transmissive region and a reflective region are provided within each of pixels assigned for display of three primary colors of red, green, and blue so that the display can be seen in a bright environment and in a dark environment, similar to the first preferred embodiment, the present embodiment is not limited to a transflective LCD and may be applied to a transmissive LCD and a reflective LCD having pixels of three primary colors of red, green, and blue.

A liquid crystal driving TFT 20 is formed in each pixel of three primary colors of red, green, and blue on a first glass substrate 100. An interlayer insulating film 34 (and more preferably, a planarizing insulating layer above the interlayer insulating film 34) is formed covering the liquid crystal driving TFTs 20 and a pixel electrode 200 is formed above the interlayer insulating film 34 in each pixel region. The pixel electrode 200 is formed by a transparent electrode 210 made of ITO in the transmissive region and is formed by a reflective electrode 220 made of a material having a superior reflection characteristic such as aluminum in the reflective region.

In a blue pixel, the reflective electrode 220(*b*) is connected to a source or a drain of the liquid crystal driving TFT 20 via a contact hole formed through the interlayer insulating film 34 and the reflective electrode 220 is in contact with and electrically connected to the transparent electrode 210. Similarly, in the green pixel and red pixel, the reflective electrode 220 is connected to a source or a drain of the liquid crystal driving TFT 20 via a contact hole formed through the interlayer insulating film 34 and the reflective electrode 220 is in contact with and electrically connected to the transparent electrode 210. When it is difficult to achieve a direct contact between the reflective electrode 220 and the transparent electrode 210, it is preferable to insulate the reflective electrode 220 from the TFT 20, form a transparent electrode 210 made of a transparent conductive metal oxide over the entire pixel region directly covering the reflective electrode 220, and connect the transparent electrode 210 to the TFT 20 via a contact hole, as is described with reference to FIG. 6.

A first vertical alignment film 262 made of an organic material such as, for example, polyimide and polyamide is formed covering the transparent electrode 210 and the reflective electrode 220 in each pixel.

A second glass substrate 300 is placed opposing and in parallel to the first glass substrate 100. On a surface, of the second glass substrate 300, opposing the first glass substrate 100, a blue color filter layer 332*b* which allows light of blue color to transmit, a green color filter layer 332*g* which allows light of green color to transmit, and a red color filter layer 332*r* which allows light of red color to transmit are formed corresponding to the pixels of three primary colors of red, green, and blue, for filtering light which is incident on the liquid crystal layer 400 from a light source provided on the side of the second substrate 300 or on the side of the first substrate 100 as shown in FIG. 1 or from a light source made of ambient light on the side of the second substrate 300 and transmitting toward the second glass substrate 300.

In each reflective region of each pixel, a projection 340*b* made of a photosensitive resin is formed on the blue color filter layer 332*b* in a region corresponding to the reflective region, a projection 340*g* made of a photosensitive resin is formed on the green color filter layer 332*g* in a region corresponding to the reflective region, and a projection 340*r* made of a photosensitive resin is formed on the red color filter layer 332*r* in a region corresponding to the reflective region. The projections 340 (340*b*, 340*g*, and 340*r*) are gap adjusting layers (gap adjusting projections) for adjusting the cell gap to desired values in the reflective region and the transmissive region as described in the first preferred embodiment. By selectively providing the gap adjusting layer 340 in the reflective region, the opposing distance (gap) between the first glass substrate 100 and the second glass substrate 300 is set to be smaller in the reflective region than that in the transmissive region, to achieve a superior reflective characteristic (display characteristic in the reflective region). In the illustrated structure, the thickness of the projections 340 is identical in the red, green, and blue pixels.

A transparent common electrode 320 made of ITO is formed covering the blue color filter layer 332*b*, green color filter layer 332*g*, and red color filter layer 332*r* on each of which a projection 340 is formed and a second vertical alignment film 264 made of an organic material such as, for example, polyimide and polyamide is formed covering the common electrode 320. Liquid crystal 400 having a negative dielectric constant anisotropy is sealed in a space between the first glass substrate 100 and the second glass substrate 300.

A quarter wavelength ($\lambda/4$) plate 111 and a polarizer plate 112 are attached to the backside (side from which light is emitted) of the first glass substrate 100 as a phase difference plate. Similarly, a quarter wavelength ($\lambda/4$) plate 111 and a polarizer plate 112 are attached to the backside (side from which light is emitted) of the second glass substrate 300 as a phase difference plate. With this structure, depending on the voltage setting on the pixel electrode and the common electrode 214, when no voltage is applied to the liquid crystal 400, the incident light to the liquid crystal layer 400 is not emitted to the outside from the side of the second glass substrate 300 and black display is achieved, and, when a voltage is applied to the liquid crystal layer 400, the transmittance of the light emitted from the side of the second substrate 300 to the outside, that is, the transmittance for the liquid crystal layer, increases based on the applied voltage.

A characteristic in the second preferred embodiment can be found in the thicknesses of the color filter layers 332*b*, 332*g*, and 332*r* for blue, green, and red. When the thickness of the blue color filter layer 332*b* is D-blue, the thickness of the green color filter layer 332*g* is D-green, and the thickness of the red color filter layer 332*r* is D-red, the thicknesses satisfy a condition of D-blue≧D-green>D-red. The gap (thickness of liquid crystal sandwiched by the substrate) in the transmissive region of pixels for red, green, and blue satisfies a relationship opposite to that of the thicknesses of the color filter layers. That is, when the gap in the transmissive region of blue pixel is G-blue(T), the gap in the transmissive region of green pixel is G-green(T), and the gap in the transmissive region of red pixel is G-red(T), the gaps satisfy a condition of G-red(T)>G-green(T)≧G-blue(T). In this manner, by setting the thicknesses of the blue color filter layer 332*b*, green color filter layer 332*g*, and red color filter layer 332*r* to differ from each other to achieve different gaps (also referred to as "cell gap") among the pixels, it is possible to achieve uniform V-T characteristic for pixels for red, green, and blue.

Next, the V-T characteristic of pixels for red, green, and blue will be described based on an experimental result shown in FIGS. 17A-17C. In FIGS. 17A-17C, the horizontal axis represents voltage to be applied to the liquid crystal 400 and the vertical axis represents transmittance of incident light.

When D-blue=D-green=D-red (when the thickness of all color filter layers is identical) as shown in FIG. 17C, the V-T characteristic significantly differ among red, green, and blue. When the thicknesses are set to satisfy the condition of D-blue>D-green>D-red as shown in FIG. 17A, the V-T characteristics of blue and red pixels become closer to the V-T characteristic of the green pixel. When the gap of red, green, and blue are set to G-red (T)=4.8 μm, G-green (T)=4.0 μm, and G-blue (T)=3.3 μm through setting of the thicknesses of the blue color filter layer **332*b*, green color filter layer 332*g*, and red color filter layer 332*r*, the V-T characteristic can be set almost identical for red, green, and blue. With this configuration, it is possible to select a suitable white voltage Vwhite (for example, a voltage V in which the transmittance is maximized) to realize display driven by a low voltage and having no coloring When the thicknesses are set to achieve a condition of D-blue=D-green>D-red as shown in FIG. 17B, the V-T characteristics of blue and green pixels are identical to those in FIG. 17C, but the V-T characteristic of the red pixel becomes closer to the V-T characteristic of the green pixel. With this configuration, a high transmittance can be obtained in the red pixel at a lower voltage V compared to the V-T characteristic of FIG. 17**C, and thus, the problem of coloring can be improved accordingly.

In the reflective region, gap adjusting layers (projections) **340*r*, 340*g*, and 340*b* are provided for the pixels for red, green, and blue, but the color filter layers 332*b*, 332*g*, and 332*r* for blue, green, and red are present both in the transmissive region and the reflective region. Therefore, by setting the thicknesses of the color filter layers 332*b*, 332*g*, and 332*r* as described above, the relationship in the sizes of the gaps in the reflective regions becomes similar to that in the transmissive region. In other words, when the gap of blue pixel in the reflective region is G-blue (R), the gap of green pixel in the reflective region is G-green(R), the gap of red pixel in the reflective region is G-red (R), and the heights of the projections 340*b*, 340*g*, and 340*r*** are identical to each other, a relationship of G-red (R)>G-green (R)≧G-blue (R) is satisfied. Therefore, in the second preferred embodiment, the V-R characteristic (characteristic of applied voltage to the liquid crystal versus reflectance) of pixels for red, green, and blue becomes more uniform, and therefore, similar to the above, a display driven by a low voltage and having no coloring can be obtained.

A method of forming the color filters **332*r*, 332*g*, and 332*b* for red, green, and blue will now be described. Each color filter layer can be formed basically by spin coating a photosensitive resin including a pigment of the color on the second glass substrate 300 and applying exposure and development processes to pattern so that the resin remains in a predetermined region. However, in the second preferred embodiment, because the thicknesses of the color filter layers are not identical, when a thick color filter layer, for example, the blue color filter layer 332*b* is formed first, projections and depressions on the surface of the second glass substrate 300 becomes large, making it difficult to form the other color filter layers, for example, the red color filter layer 332*r***.

In consideration of this, it is preferable that the red color filter layer **332*r* which is thin is formed first, the green color filter layer 332*g* is formed next, and the blue color filter layer 332*b* is formed last, in order to facilitate manufacturing steps. When the thickness of the blue color filter 332*b* and the green color filter layer 332*g*** are identical, the two color filter layers having the same thickness can be formed in any order.

Third Preferred Embodiment

Figure 18:
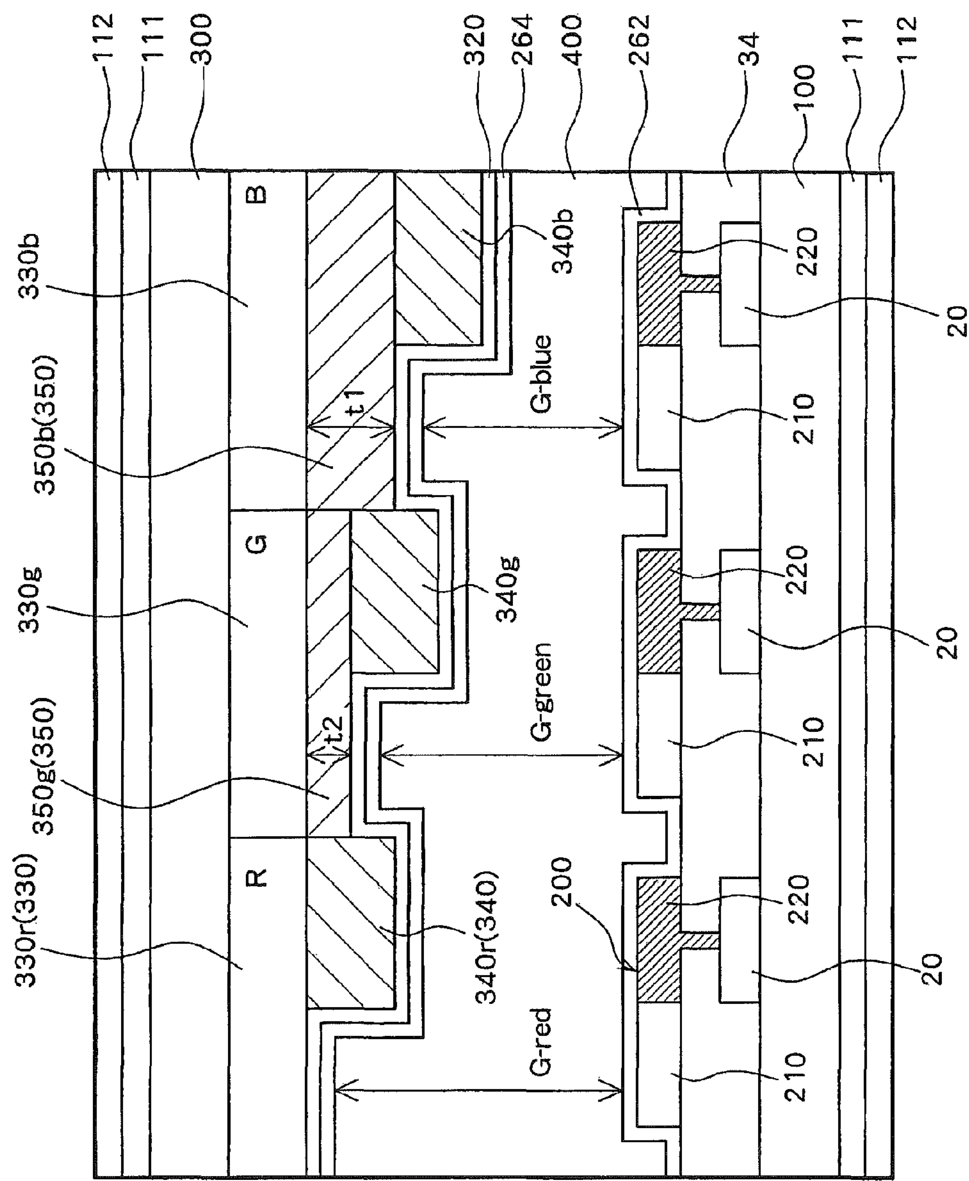
FIG. 18 is a cross sectional diagram showing a vertical alignment liquid crystal display device according to a third preferred embodiment of the present invention.

A third preferred embodiment of the present invention will now be described referring to the drawings. FIG. 18 is a diagram schematically showing a cross sectional structure of a vertical alignment liquid crystal display device according to the third preferred embodiment of the present invention. The components identical to those in the second preferred embodiment are assigned the same reference numerals and will not described again.

In the third preferred embodiment, in order to achieve different optimum thicknesses of gap G in the red, green, and blue pixels, in addition to the red, green, and blue color filter layers **330*r*, 330*g*, and 330*b* formed on the side of the second glass substrate 300 and the projections 340 (340*r*, 340*g*, and 340*b*) for adjusting the gap difference between the transmissive region and the reflective region, an adjusting layer (gap layer) 350 for adjusting the gap difference for red, green, and blue is provided. More specifically, in the blue and green pixel regions which require smaller cell gaps G than the cell gap G in the red pixel region, photosensitive resin layers 350*b* and 350*g* are selectively formed on the blue color filter layer 330*b* and the green color filter layer 330*g*, respectively, as the adjusting layer 350. In this description, the thickness of the photosensitive resin layer 350*b* on the blue color filter layer 330*b* is assumed to be t1 and the thickness of the photosensitive resin layer 350*g* on the green color filter layer 330*g* is assumed to be t2. The values of t1 and t2 are set so that t1≧t2**. When a gap (thickness of the liquid crystal sandwiched between substrates) in the transmissive region of the blue pixel is G-blue (T), the gap in the transmissive region of the green pixel is G-green(T), and the gap in the transmissive region of the red pixel is G-red(T), these gaps satisfy a condition of G-red(T)>G-green(T)≧G-blue (T).

In the third preferred embodiment, as shown in FIG. 18, when the thicknesses of the color filter layers **330*r*, 330*g*, and 330*b* are set to an identical thickness and the thicknesses of the projections 340*r*, 340*g*, and 340*b* are also set to an identical thickness, if t1=t2**, the cell gaps satisfy a condition of G-green=G-blue.

In this manner, by selectively forming the photosensitive resin layer 350 at a necessary color region to achieve different optimum gaps (also referred to as "cell gap") in the pixels for red, green, and blue, it is possible to achieve a more uniform V-T characteristic for pixels for red, green, and blue.

Figure 19A:
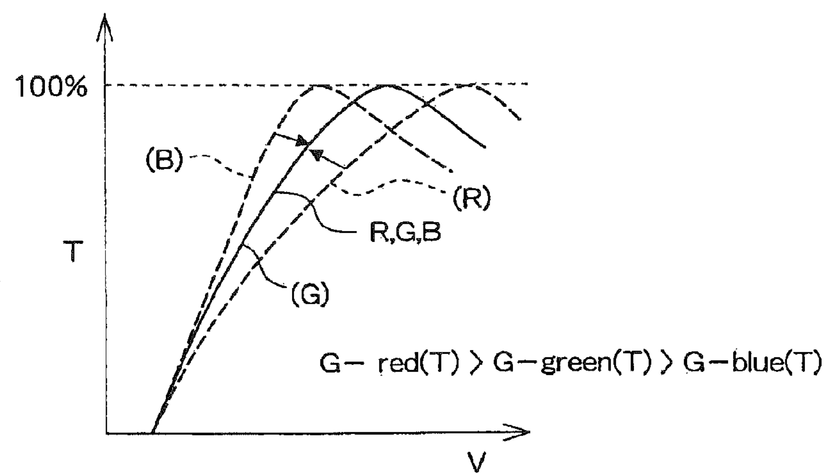
FIGS. 19A, 19B, and 19C are diagrams showing V-T characteristics for various cell gaps for pixels for red, green, and blue.
Figure 19B:
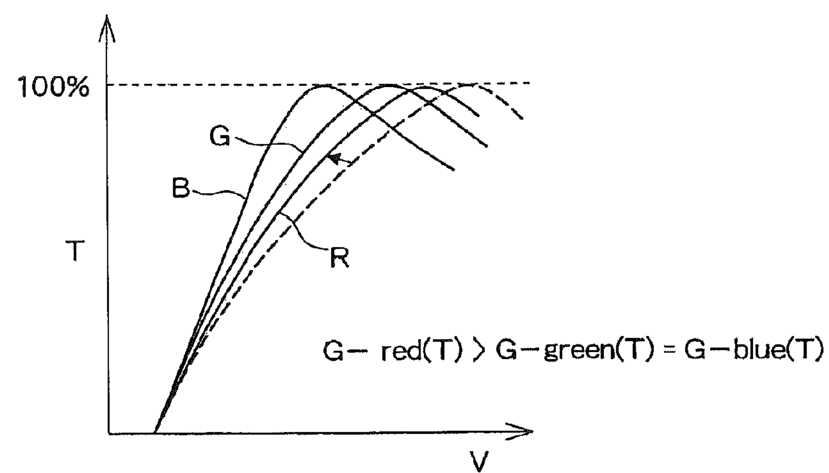
Figure 19C:
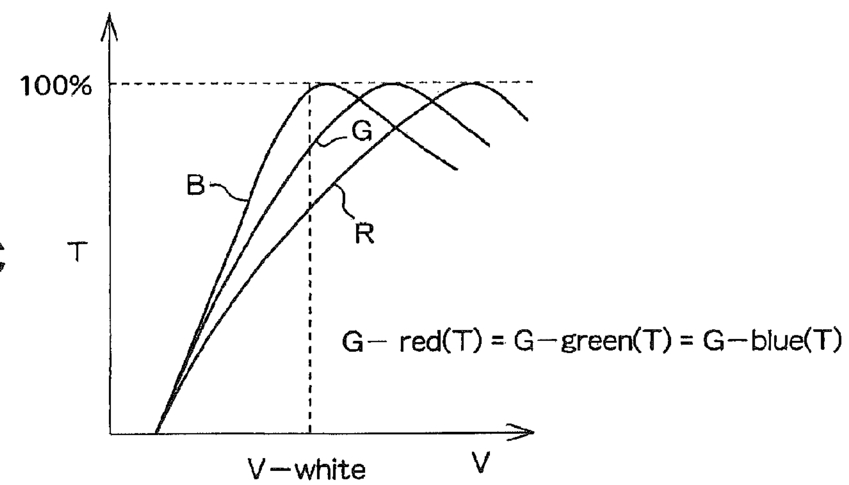

Next, a V-T characteristic of red, green, and blue pixels will be described referring to an experimental result of FIGS. 19A-19C. In FIGS. 19A-19C, the horizontal axis represents voltage to be applied to the liquid crystal 400 and the vertical axis represents transmittance of incident light.

First, when G-red (T)=G-green (T)=G-blue (T) as shown in FIG. 19C (when the photosensitive resin layers **350*g* and 350*b* are not provided), the V-T characteristic significantly differs among red, green, and blue. When, on the other hand, a condition of G-red (T)>G-green(T)>G-blue (T) is satisfied as shown in FIG. 19A, the V-T characteristics of blue and red pixels become closer to the V-T characteristic of the green pixel (the characteristics for red, green, and blue without the correction are described in parentheses in FIG. 19**A). More specifically, when the gaps for red, green, and blue are set to G-red=4.8 μm, G-green=4.0 μm, and G-blue=3.3 μm, the V-T characteristics of red, green, and blue can be set almost identical to each other. With this configuration, by selecting a suitable white voltage Vwhite (for example, a voltage V in which the transmittance is maximized), it is possible to obtain display driven by a low voltage and having no coloring.

When G-red (T)>G-green (T)=G-blue (T) as shown in FIG. 19B, the V-T characteristics of blue and green pixels are identical to those in FIG. 19C, but the V-T characteristic of the red pixel becomes closer to the V-T characteristic of the green pixel. With this structure, compared to the V-T characteristic of FIG. 19C, it is possible to obtain a high transmittance at a lower voltage V for the red pixel, and thus, to improve the problem of coloring.

In the reflective region, projections 340 are formed for each of the red, green, and blue pixels. However, because the thicknesses of the projections 340 are set to an identical value for red, green, and blue, the relationship among the gaps in the reflective region is similar to that in the transmissive region. That is, when the gap in the reflective region of the blue pixel is G-blue (R), the gap in the reflective region of the green pixel is G-green(R), and the gap in the reflective region of the red pixel is G-red(R), the gaps satisfy a condition of G-red(R) >G-green(R)≧G-blue (R). Therefore, with the third preferred embodiment also, the V-R characteristic (characteristic of applied voltage to the liquid crystal versus reflectance) in red, green, and blue pixels can be more uniform, and, thus, it is possible to obtain a display driven by a low voltage and having no coloring.

What is claimed is:

1. A liquid crystal display device comprising:

a plurality of pixels; and vertical alignment liquid crystal which is sealed between a first substrate having a pixel electrode and a second substrate having a common electrode, wherein each of the pixels has a shape in which a column direction is longer than a row direction;

each of the pixels is divided into a first pixel region and a second pixel region having different areas by a boundary extending in the row direction and bent in a V shape;

the first pixel region is formed such that an end portion thereof defined by a vertex of the boundary which is bent in a V shape cuts into the second pixel region;

an alignment of liquid crystal of the first pixel region and an alignment of liquid crystal of the second pixel region are different; and in the first pixel region, the liquid crystals are aligned toward a first center line in the first pixel region, and in the second pixel region, the liquid crystals are aligned toward a second center line in the second pixel region.

2. The liquid crystal display device according to claim 1, wherein the alignment of liquid crystal of the first pixel region is perpendicular to the row direction, and the alignment of liquid crystal of the second pixel region is perpendicular to the column direction.

3. The liquid crystal display device according to claim 2, wherein the area of the first pixel region is smaller than the area of the second pixel region.

4. The liquid crystal display device according to claim 1, wherein in the first pixel region, the alignment direction of the liquid crystal is divided into two regions, and in the second pixel region, the alignment direction of the liquid crystal is divided into two regions.

5. The liquid crystal display device according to claim 4, wherein the area of the first pixel region is smaller than the area of the second pixel region.

6. A liquid crystal display device comprising:

a plurality of pixels; and vertical alignment liquid crystal which is sealed between a first substrate having a pixel electrode and a second substrate having a common electrode, wherein each of the pixels has a shape in which a column direction is longer than a row direction;

each of the pixels is divided into a first pixel region and a second pixel region having different areas by a boundary extending in the row direction;

in the first pixel region, the alignment direction of the liquid crystal is divided into four regions; and in the second pixel region, the alignment direction of the liquid crystal is divided into four regions wherein the boundary is bent in a V shape;

in the first pixel region, the liquid crystals are aligned toward a first center line in the first pixel region, and in the second pixel region, the liquid crystals are aligned toward a second center line in the second pixel region; and the area of the first pixel region is smaller than the area of the second pixel region.

7. The liquid crystal display device according to claim 6, wherein, the four alignment directions in the first pixel region and the four alignment directions in the second pixel region are the same.

8. The liquid crystal display device according to claim 6, wherein, the area of the first pixel region is smaller than the area of the second pixel region.

9. The liquid crystal display device according to claim 6, wherein the boundary which forms divided pixel regions is bent in a V shape and the first pixel region is formed such that an end portion thereof defined by a vertex of the boundary which is bent in a V shape cuts into the second pixel region.

* * * * *